(12) United States Patent
Yerazunis et al.

(10) Patent No.: US 9,281,875 B2
(45) Date of Patent: Mar. 8, 2016

(54) SYSTEM AND METHOD FOR AUTOMATICALLY OPTIMIZING WIRELESS POWER

(75) Inventors: William S. Yerazunis, Acton, MA (US);
Bingnan Wang, Boston, MA (US);
Chunjie Duan, Brookline, MA (US);
John Barnwell, Leominster, MA (US);
Dan J. Burns, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 780 days.

(21) Appl. No.: 13/209,366

(22) Filed: Aug. 12, 2011

(65) Prior Publication Data

US 2012/0217818 A1      Aug. 30, 2012

Related U.S. Application Data

(60) Provisional application No. 61/447,599, filed on Feb. 28, 2011.

(51) Int. Cl.
*H02J 17/00*          (2006.01)
*H04B 5/00*          (2006.01)
*H02J 5/00*          (2006.01)
*B60L 11/18*         (2006.01)

(52) U.S. Cl.
CPC .......... *H04B 5/0081* (2013.01); *B60L 11/1846* (2013.01); *H02J 5/005* (2013.01); *H02J 17/00* (2013.01); *H04B 5/0037* (2013.01); *H04B 5/0087* (2013.01)

(58) Field of Classification Search
CPC ........ H02J 17/00; H02J 5/005; H04B 5/0037; H04B 5/0081; H04B 5/0087
USPC .......................................................... 307/104
See application file for complete search history.

(56) References Cited

U.S. PATENT DOCUMENTS

| | | | | |
|---|---|---|---|---|
| 5,412,989 A | * | 5/1995 | Eberle et al. | 73/592 |
| 5,448,681 A | * | 9/1995 | Khan | 706/23 |
| 7,761,458 B1 | * | 7/2010 | Eshghi et al. | 707/755 |
| 2001/0012208 A1 | * | 8/2001 | Boys | 363/23 |
| 2007/0162803 A1 | * | 7/2007 | Dervisoglu et al. | 714/726 |

(Continued)

FOREIGN PATENT DOCUMENTS

WO        2008114268 A2      9/2008

OTHER PUBLICATIONS

Song, Y. & Aboelela, E. (Nov. 18, 2004). A parallel IP-address forwarding approach based on partitioned lookup table techniques. Proceedings of the 29th Annual IEEE International Conference on Local Computer Networks (LCN'04), 425-426. doi: 10.1109/LCN.2004.7.*

(Continued)

*Primary Examiner* — Jared Fureman
*Assistant Examiner* — Joel Barnett
(74) *Attorney, Agent, or Firm* — Gene Vinokur; Dirk Brinkman

(57) ABSTRACT

A system transfers energy wirelessly from a source to a sink as an EM near-field according to parameters. The source includes a receive RF chain, and a receive controller. The sink includes a transmit RF chain, and a receive controller. The receive controller measures the energy received as feedback information, which is transmitted to the sink. Then, the transmit controller dynamically varies the parameters to optimized the energy received at the sink.

18 Claims, 38 Drawing Sheets

(56) References Cited

U.S. PATENT DOCUMENTS

| | | | |
|---|---|---|---|
| 2008/0252773 A1* | 10/2008 | Oishi | 348/347 |
| 2009/0096413 A1* | 4/2009 | Partovi et al. | 320/108 |
| 2009/0174263 A1 | 7/2009 | Baarman | |
| 2010/0036773 A1* | 2/2010 | Bennett | 705/67 |
| 2010/0052431 A1* | 3/2010 | Mita | 307/104 |
| 2010/0187913 A1 | 7/2010 | Smith | |
| 2010/0225173 A1 | 9/2010 | Aoyama | |
| 2010/0237709 A1 | 9/2010 | Hall | |
| 2010/0259217 A1 | 10/2010 | Baarman | |
| 2011/0006611 A1* | 1/2011 | Baarman et al. | 307/104 |

OTHER PUBLICATIONS

Emmelmann, M., Wiethoelter, S. & Lim, H. (Jun. 19, 2009). Opportunistic scanning: Interruption-free network topology discovery for wireless mesh networks. World of Wireless, Mobile and Multimedia Networks & Workshops, 2009, 1-6. doi: 10.1109/WOWMOM.2009.5282457.*

* cited by examiner

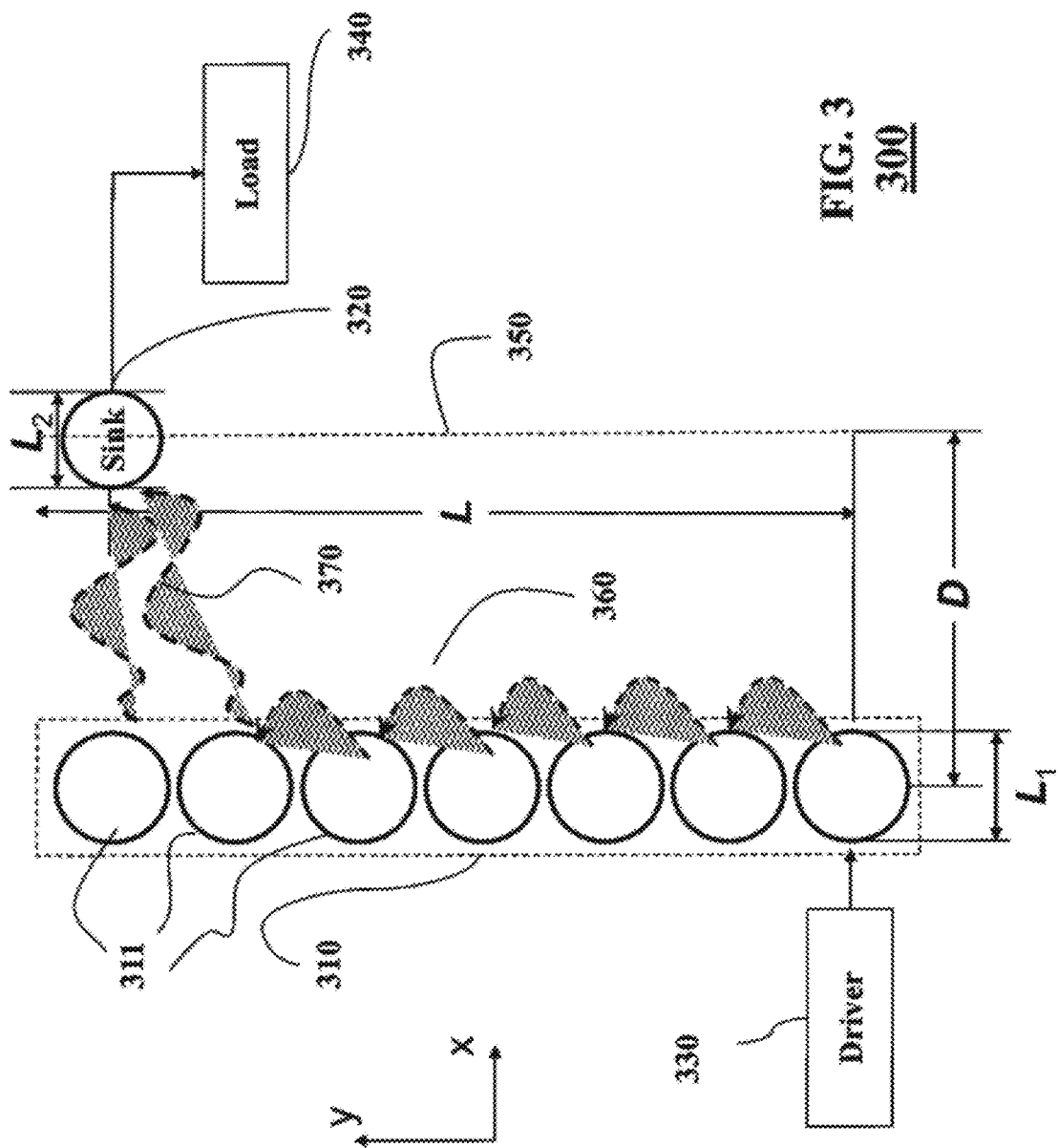

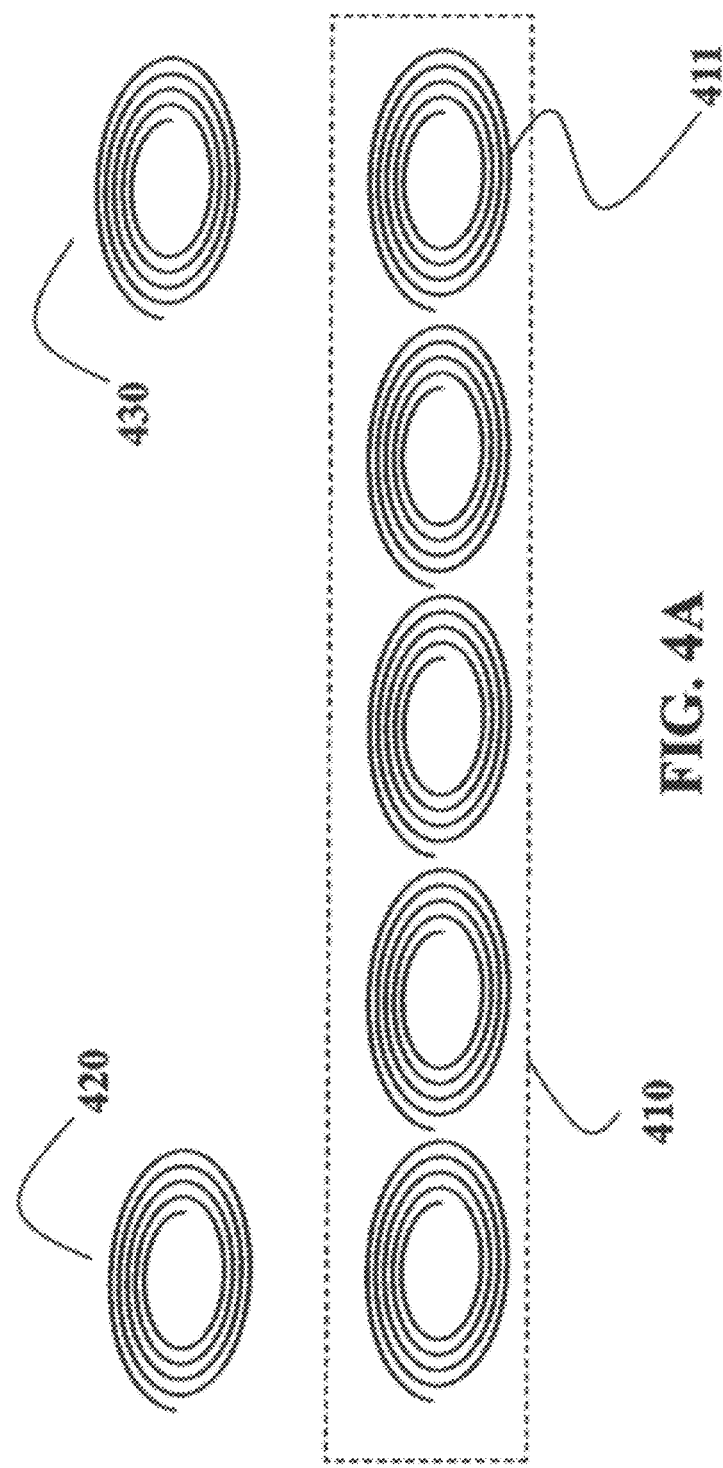

440

450

460

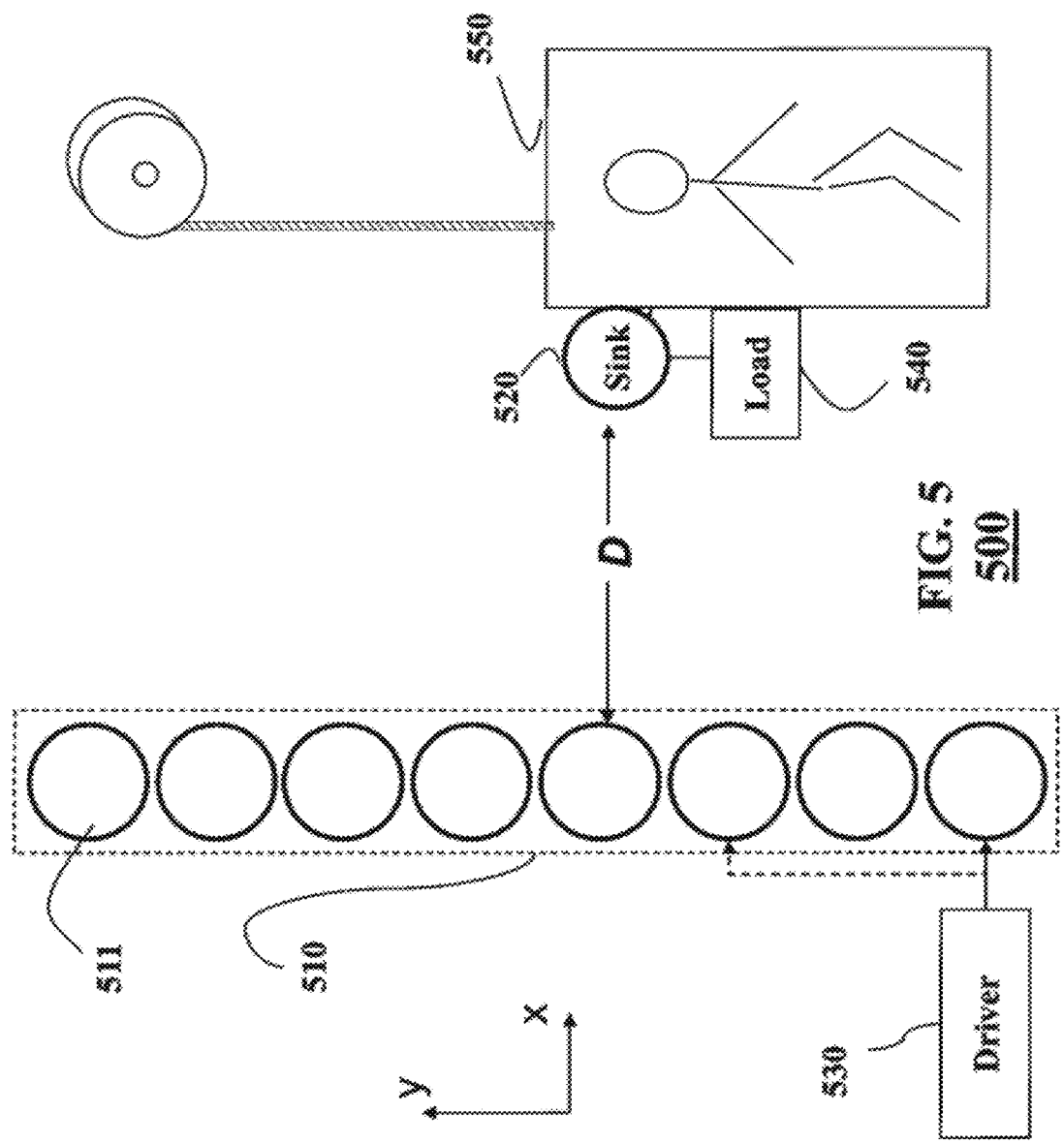

700

800

900

1000

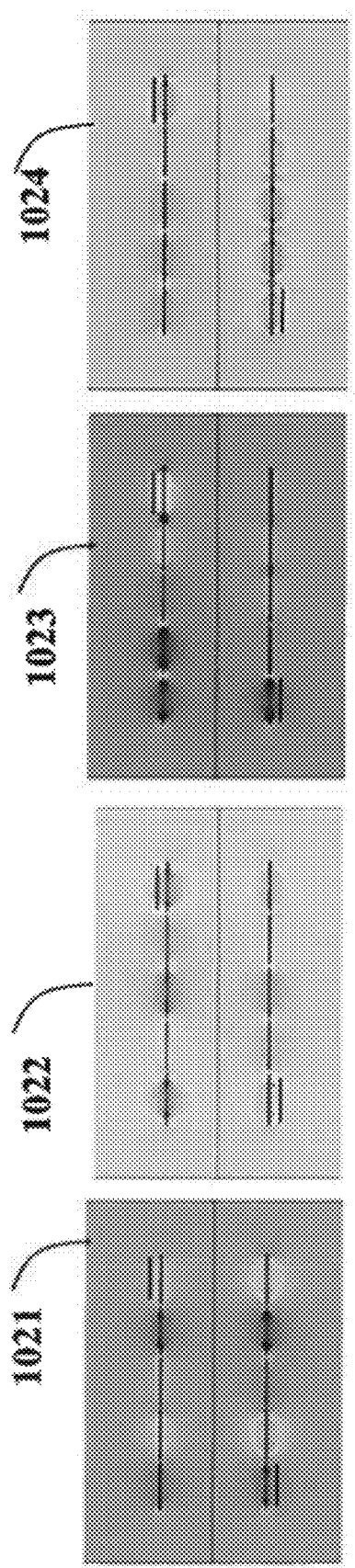

1100

1200

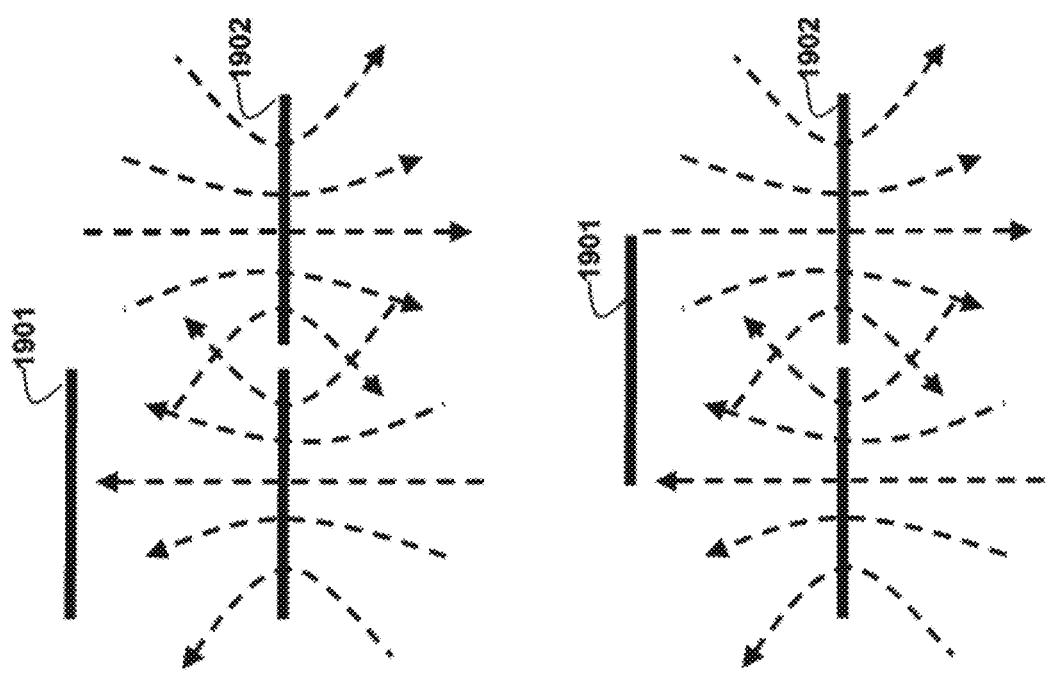

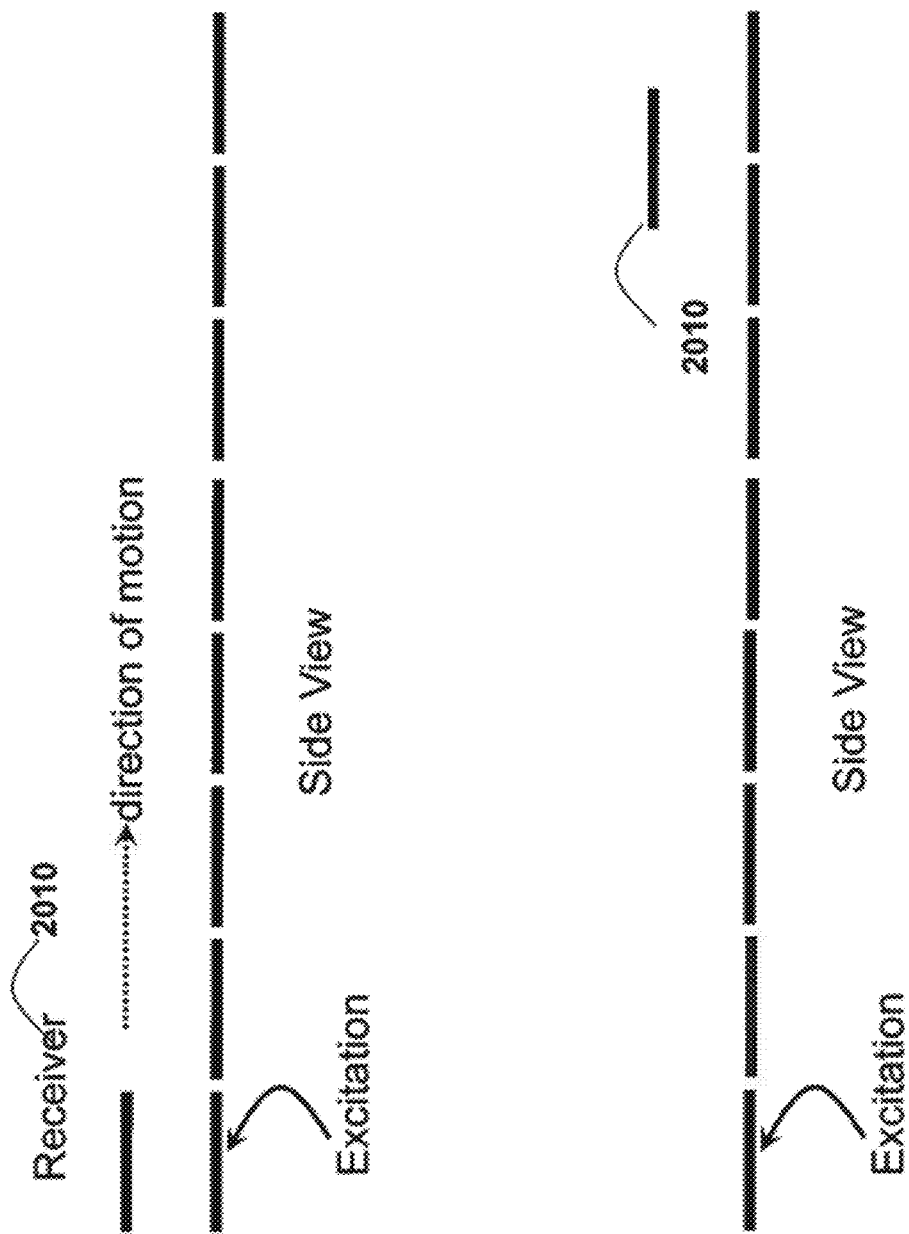

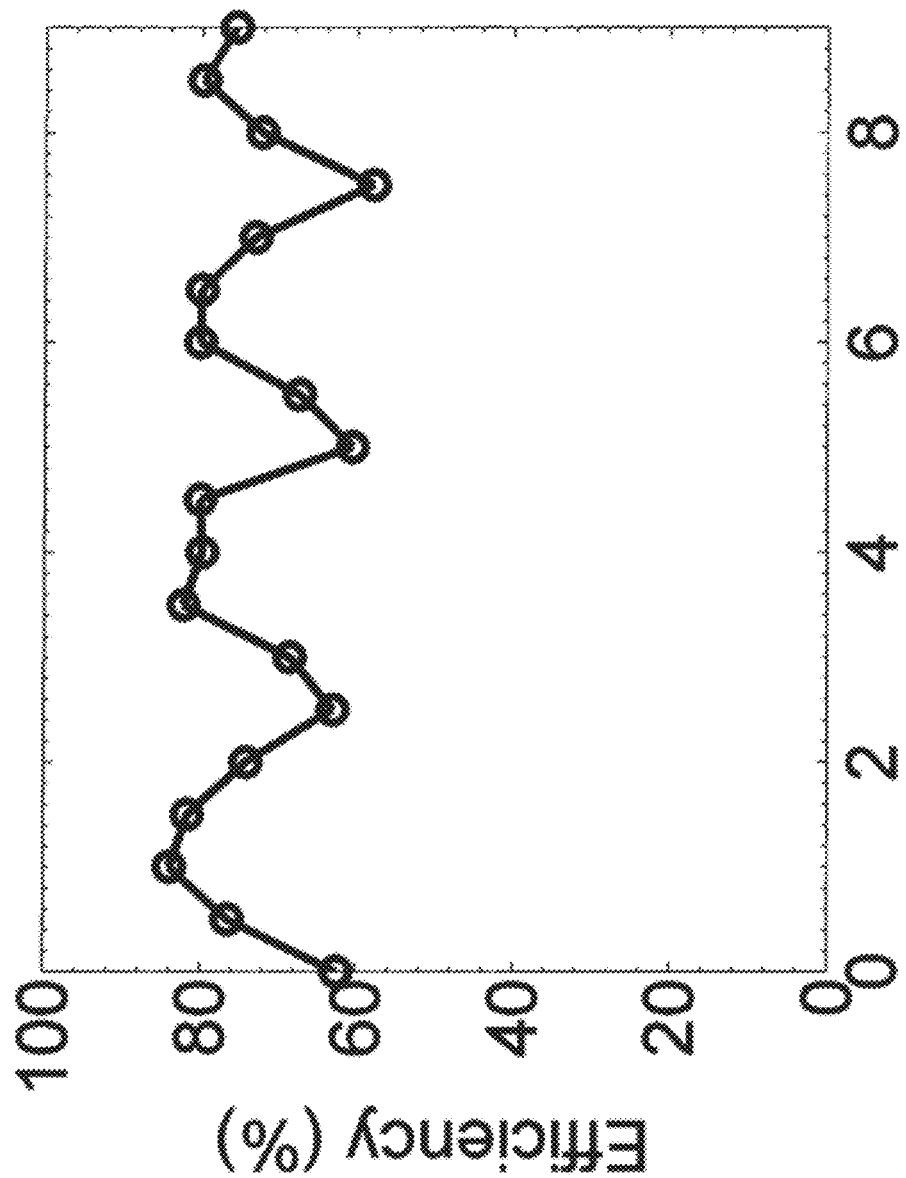

SYSTEM AND METHOD FOR AUTOMATICALLY OPTIMIZING WIRELESS POWER

RELATED APPLICATION

The present invention claims priority to U.S. Provisional Patent Application 61/447,599, "Wireless Energy transfer Using Array of Resonant Objects," filed by Wang et al. on Feb. 28, 2011, and is related to U.S. patent application Ser. No. 13/209,297 "Wireless Energy transfer Using Arrays of Resonant Objects," co-filed herewith by Wang et al. on Aug. 12, 2011, and U.S. patent application Ser. No. 13/209,336 "Tuning electromagnetic fields characteristics for wireless energy transfer using arrays of resonant objects," co-filed herewith by Wang et al. on Aug. 12, 2011, all incorporated herein by reference.

FIELD OF THE INVENTION

The present invention relates generally to transferring energy wirelessly, and more particularly to transferring energy using arrays of resonant objects.

BACKGROUND OF THE INVENTION

Wireless Energy Transfer

Inductive coupling is used in a number of wireless energy transfer systems, such as a cordless electronic toothbrush, or vehicle batteries. In coupled inductors, such as transformers, a source, e.g., a primary coil, generates energy as an electromagnetic field, and a sink, e.g., a secondary coil, subtends that field such that the energy passing through the sink is optimized, e.g., the energy generated by the sink is as similar as possible to the energy of the source. To optimize the energy, a distance between the source and the sink should be as small as possible, because over greater distances the inductive coupling method is highly ineffective.

Resonant Coupling System

FIG. 1 shows a conventional resonant coupling system 100 for transferring energy from a source 110 to a sink 120. In resonant coupling, two resonant electromagnetic objects, i.e., the source and the sink, interact with each other under resonance conditions.

A driver 140 inputs the energy into the source to form an oscillating electromagnetic field 115. The excited electromagnetic field attenuates at a rate with respect to the signal frequency at the driver or self resonant frequency of the source and sink in a resonant system. However, if the sink absorbs more energy than is lost during each cycle, then most of the energy is transferred to the sink. Operating the source and the sink at the same resonant frequency ensures that the sink has low impedance at that frequency, and that the energy is optimally received.

The energy is transferred, over a distance D, between resonant objects, e.g., the source has a length $L_1$ and the sink has a length $L_2$. The driver connects a power provider to the source. The sink is connected to a power consuming device, e.g., a resistive load 150. Power is supplied by the driver to the source, transferred wirelessly and non-radiatively as energy from the source to the sink. The rate of energy transfer powers the load. The wireless non-radiative energy transfer is performed using the field 115, e.g., the electromagnetic field or an acoustic field of the resonant system. For simplicity of this description, the field 115 is an electromagnetic field. During the coupling of the resonant objects, evanescent fields 130 are propagated between the source and the sink.

However, the resonant coupling transfers energy from the source to the sink over a mid-range distance, e.g., a few times of the resonant frequency wavelength, is inefficient when the distance becomes larger. It is thus desirable to extend the range of efficient wireless energy transfer.

SUMMARY OF THE INVENTION

The embodiments of the invention are based on a realization that an array of strongly coupled resonant objects extends the range of efficient wireless energy transfer and facilitates an efficient energy transfer to receiving objects moving over a large distance.

Embodiments of the invention are based on another realization that, if the energy is provided to at least one object of an array of strongly coupled resonant objects, the energy oscillates among all objects in the array with reasonable losses. If the energy is provided to at least one object in the array, the energy is distributed from the object to all other objects in the array. Thus, the sink can receive energy wirelessly from any object of the array. Accordingly, the embodiments of the invention provide a novel way to store and distribute energy for subsequent wireless retrieval of the energy at any desired direction and distance from the energy driver.

In conventional energy distribution systems, the energy is transmitted over a closed loop to return the unused energy back to the source or to other specially designed energy storages. That was not considered as a problem, but rather as a fact of the energy transfer. The embodiments of the invention eliminate this requirement allowing arbitrarily arrangements of the objects and thus, arbitrarily configuration of energy distribution topography.

In one embodiment, a system configured to transfer energy wirelessly between a transmitting device and a receiving device is provided. The system comprises a source, which is formed by an array of resonant objects, to generate evanescent electromagnetic (EM) field. The system further comprises an energy driver for providing the energy to at least one object in the array, such that, during an operation of the system, the energy is distributed, e.g., oscillated, from the object to all other objects in the array.

In one variation of this embodiment, the system further comprises a sink at a distance from the source for receiving energy wirelessly from the source via coupling of evanescent EM fields. The sink can be resonant or non-resonant structures. The energy transfer can be achieved from any resonant object in the array of the source.

Another embodiment discloses a system configured to transfer energy wirelessly, comprising: an source comprising a first array of objects; an sink comprising a second array of objects, each object in the source and sink has a resonant frequency, is electromagnetic (EM) and non-radiative, and is configured to generate an EM near-field in response to receiving the energy; an energy driver for providing the energy at the resonant frequency to at least one object in the source, such that, during an operation of the system, the energy is distributed from the object in the source to all other objects in the source; and a load from receiving the energy from the sink, wherein each object in the first and the second arrays is arranged at a distance from all other objects in, respectively, the first and the second arrays, such that upon receiving the energy the objects in the first and the second arrays are strongly coupled to, respectively, at least one other object in the first and the second array, via a resonant coupling of evanescent fields, and wherein the sink is arranged to receive energy wirelessly from the source via the resonant coupling of one or many objects in the first array with one or many objects in the second array.

In another embodiment, a method of transferring energy wirelessly between an source and an sink is disclosed. The method comprises generating evanescent EM fields in an array of resonant objects. The method further comprises transferring energy wirelessly between the array of resonant objects and an sink. The sink can be a resonant or non-resonant structure. In another embodiment, the method further comprises transferring the energy wirelessly between the array of resonant objects and another array of resonant objects.

In another embodiment, characteristics of the electromagnetic field are tuned dynamically depending on relative positions between the source and the sink. The characteristics include frequency and phase of the electromagnetic field.

BRIEF DESCRIPTION OF THE DRAWINGS

FIG. 3 is a block diagram of a system with a resonator array as a source according to embodiments of the invention;

FIGS. 4A-D are schematics of an array of strongly coupled resonant objects according to embodiments of the invention;

FIG. 5 is block diagram of a system for supplying energy wirelessly to moving objects according to embodiments of the invention;

FIGS. 10A-E are graphs of transfer efficiency as a function of frequency in the resonant array system and corresponding resonant modes according to embodiments of the invention;

FIG. 19 is a side view of coupled resonant objects, when the receiver is at different positions;

FIG. 20 is a side view of a wireless energy transfer system, with a receiver moving from one end of the array to the other end;

FIG. 21A is a graph of energy transfer efficiency as a function of receiver position at a first frequency;

DETAILED DESCRIPTION OF THE PREFERRED EMBODIMENTS

Energy can be transferred wirelessly and efficiently between coupled resonant objects at a resonant frequency. With the size of resonant object is much smaller than the resonant wavelength, most of the energy is stored inside the resonant object and does not radiate into free space. The range of efficient wireless energy transfer depends on the physical size of resonant objects. The energy transfer is inefficient when the receiving object moves over a large distance, compared to the size of resonant objects.

Figure 1:
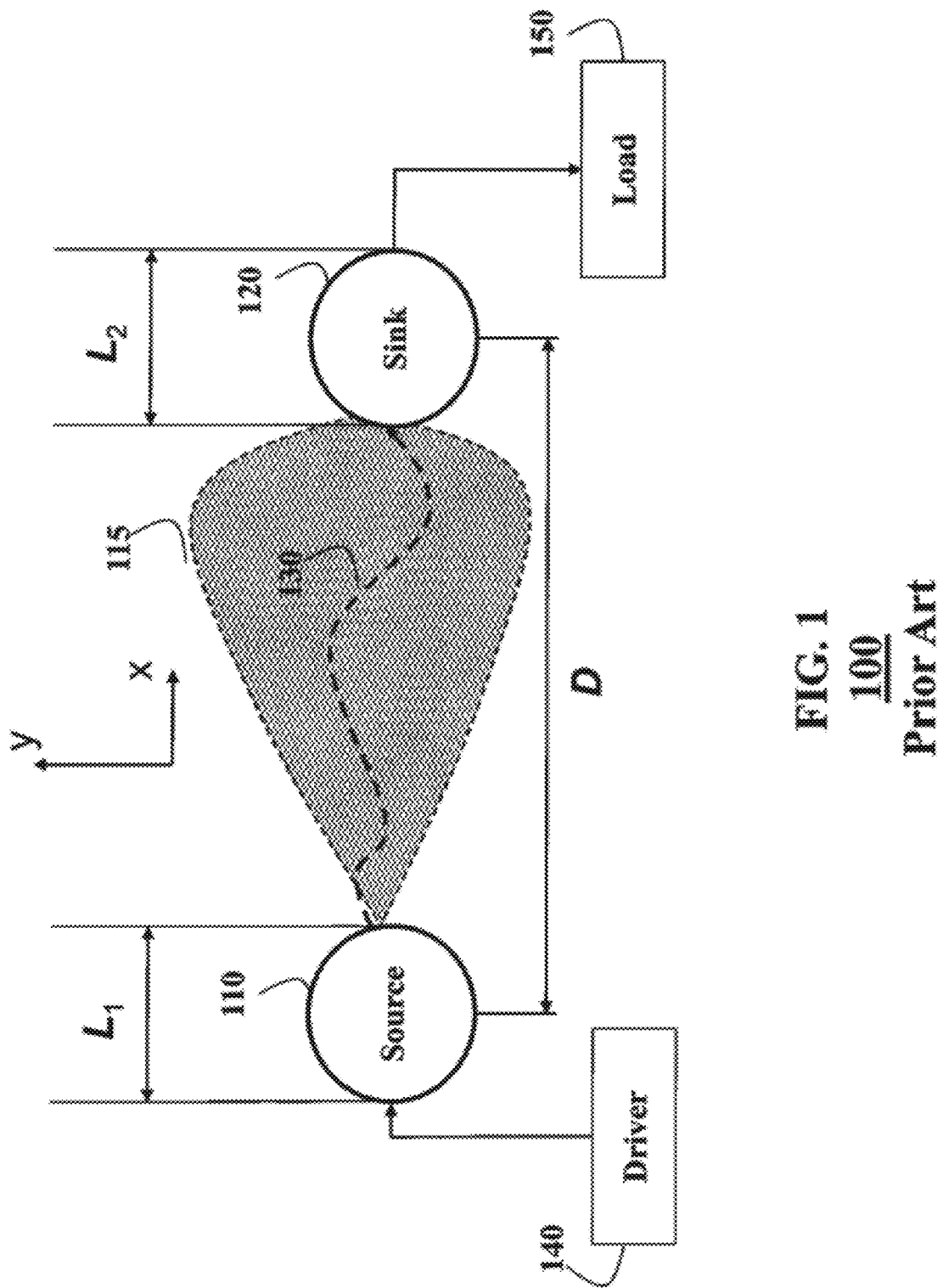
FIG. 1 is a block diagram of a conventional resonant coupling system.

Thus, the resonant energy transfer system shown in FIG. 1 is efficient when the distance D is on the order of the source size $L_1$ and the sink size $L_2$. When D is much larger than $L_1$ or $L_2$, the energy transfer system becomes inefficient. Moreover, depending on the structure design of source 110 and sink 120, the system usually requires good alignment along one axis.

Figure 2:
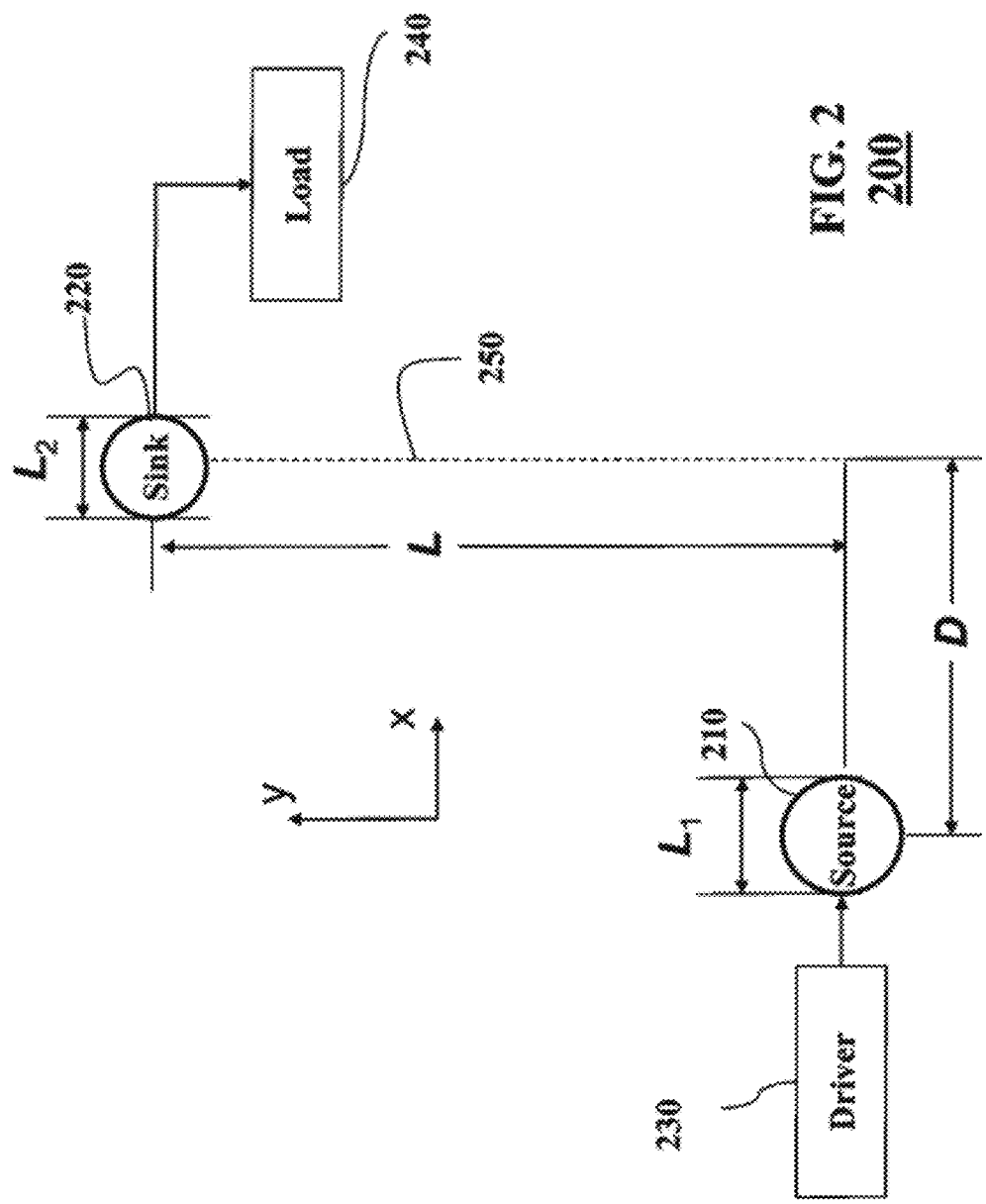
FIG. 2 is a block diagram of a system with a sink beyond a range of efficient wireless energy transfer according to embodiments of the invention.

FIG. 2 shows an example when the wireless energy transfer using source 210 and sink 220 is inefficient. The sink 220 is a distance B in the x direction and a distance L in the y direction from the source 210, where the distance L is much larger than $L_1$ and $L_2$. Moreover, the sink 220 can move along a direction 250. Thus, it is desirable to extend the range of efficient wireless energy transfer and design a system to provide energy wirelessly to mobile devices, such as elevators or electric vehicles.

The embodiments of the invention are based on a realization that an array of strongly coupled resonant objects extends the range of efficient wireless energy transfer and facilitates an efficient energy transfer to receiving objects moving over a large distance.

Coupled Resonator Array

FIG. 3 shows a system 300 according to embodiments of the invention. Instead of using one resonant object as the source, an array of at least three resonant objects 311 having the same resonant frequency is used as the source 310. Each object is electromagnetic (EM) and non-radiative, and configured to generate an EM near-field in response to receiving the energy. The array 310 can be any arrangement of the objects 311. The objects 311 in the array are arranged at a distance from each other, i.e., not physically connected, such that upon receiving the energy the object is strongly coupled to at least one other object in the array via resonant coupling of an electromagnetic field 360.

The type of resonant coupling in the array can be an inductive coupling, a capacitive coupling, or combination thereof. An energy driver 330 is used to provide energy to one or more objects in the array 310. The resonant coupling distributes the energy to all the objects in the array 310. The energy distribution in the array is achieved by the excitation of the evanescent fields 360 that propagate along the objects of the array due to the resonant coupling. The evanescent field is localized within the near-field of the resonant objects and does not radiate to free space. In one embodiment, to reduce the loss during the process, resonant objects with high quality factor (Q-factor, Q>100) are selected.

A sink 320 is a distance D away from the array. The sink can be constructed as a resonant object or a non-resonant object. The energy is transferred from the source 310 to the sink 320 via coupling of evanescent fields 370. The coupling can occur between one or more objects in the source and the sink. The sink receives energy wirelessly from the source and provides energy to a load 340. The sink can be at different positions along the direction 350. Different objects in the source 310 are coupled to the sink 320 when the sink is at different positions.

Embodiments of the invention are based on a realization that if the energy is provided to at least one object of an array of strongly coupled resonant objects, the energy oscillates among all objects in the array with reasonable losses. Thus, the sink can receive energy wirelessly from any object of the array. Accordingly, the embodiments of the invention provide a way to store and distribute energy for subsequent wireless retrieval of the energy at any desired direction and desistance from the energy driver.

In conventional wired energy distribution systems, the energy is transmitted over a closed loop to return unused energy to the source or to other specially design energy storages. That was not considered as a problem, but rather as a fact of the energy transfer. The embodiments of the invention eliminate this requirement and allow arbitrarily arrangements of the objects and thus, arbitrarily configuration of energy distribution topography.

Array Configurations

The resonant object 311 in the resonant array 310 can take any physical shape depending on the application. For example, the resonant object can be self-resonant coils, spirals, and dielectric resonators.

In one embodiment as shown in FIG. 4A, the resonant object has the form of a planar spiral 411. The resonant object can form different arrangement forming the array of different shapes. An array 410 is formed by linearly arranging multiple resonant objects. The spiral object 411 is made of conducting wires and is self-resonant at the resonant frequency. The sink can include one or more objects constructed with resonant or non-resonant structures. In one embodiment, the sink is constructed as the spiral 420, and arranged on top of one of the objects of the array 410. In another embodiment, the sink is movable between a current and another position 430. In yet another embodiment, multiple sinks 420 and 430 are used at different positions.

Figure 4B:
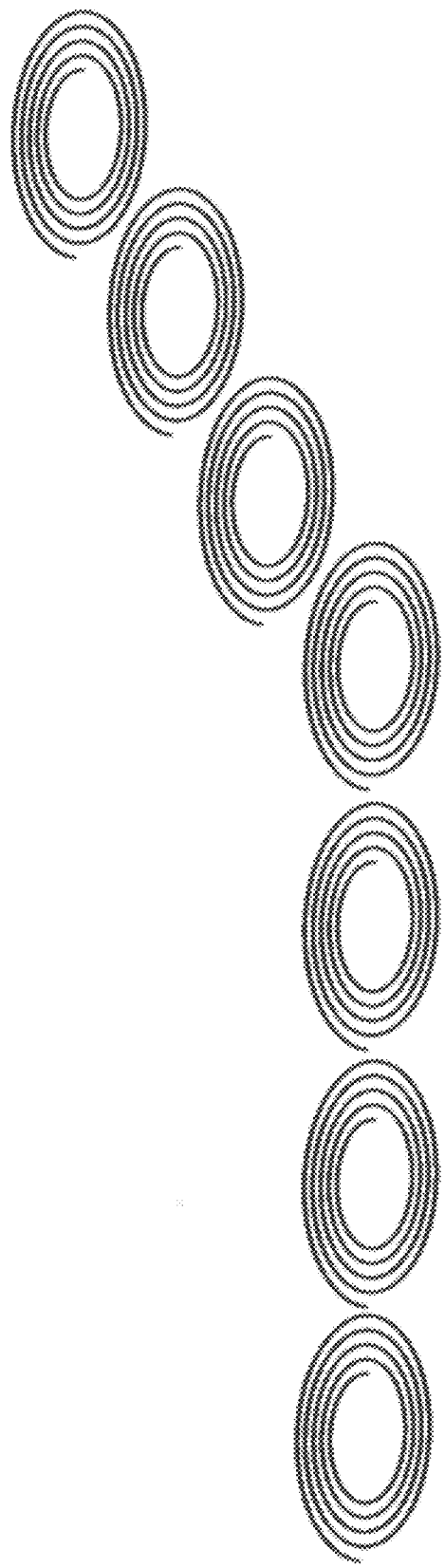
Figure 4C:
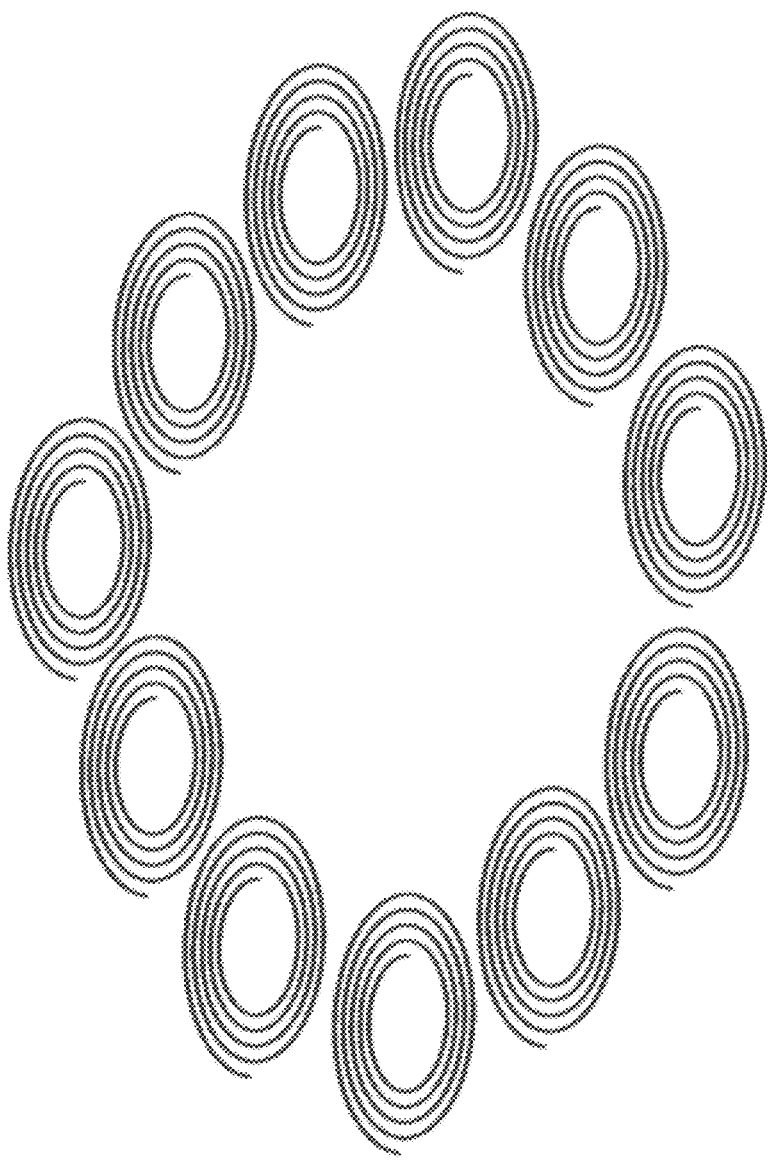
Figure 4D:
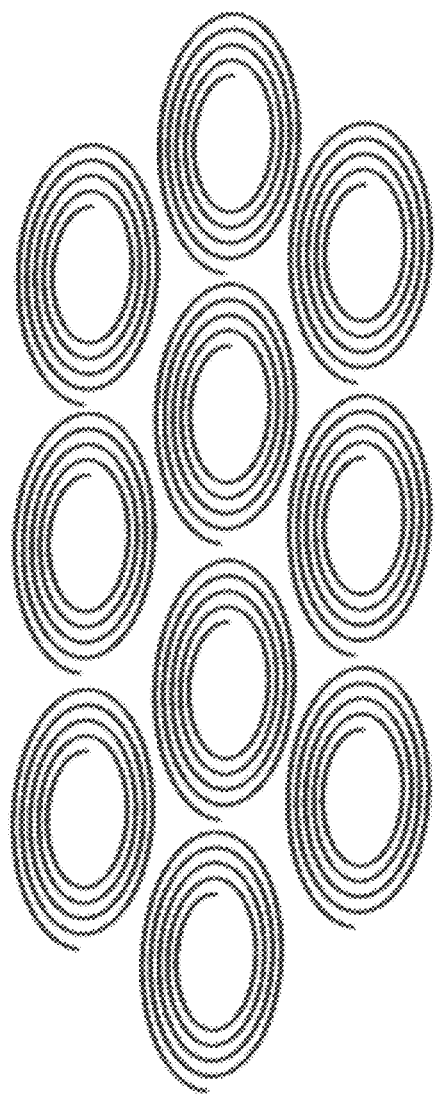

FIGS. 4B-D show more complex shapes of the array. FIG. 4B shows an array 440 of resonant objects arranged a curve. In another embodiment as shown in FIG. 4C, the resonant objects are arranged along a circle 450. In yet another embodiment as shown in FIG. 4D, the resonant objects can be arranged in two dimensions in a plane 460. In various embodiments, the sink is a resonant object having the resonant frequency for receiving the energy wirelessly.

Example Applications

The embodiments of the invention can be applied to various applications to provide energy wirelessly to mobile devices, or wirelessly charge batteries on different devices. The devices include, but are not limited to, electric vehicles, elevators, robots, electronic devices such as cellular phones, laptops.

FIG. 5 shows a system 500 for providing the energy wirelessly to an elevator car 550. The source is formed by an array 510 of resonant objects 511, and is installed at an elevator shaft. A driver 530 is used to provide energy to one or more objects in the array 510. The driver 530 is connected to a power grid. The sink 520 is a resonant object, and connected to a load 540 of the elevator for powering the elevator car. The sink 520 receives energy wirelessly from the source, and provides energy to the load 540. Both the sink 520 and the load 540 are positioned outside of the elevator car 550. Impedance matching networks and other components (not shown) can be used to control and optimize the performance of the elevator system. The system can be adapted to other applications such as wireless charging of electric vehicles.

Resonator Array as Sink

Figure 6A:
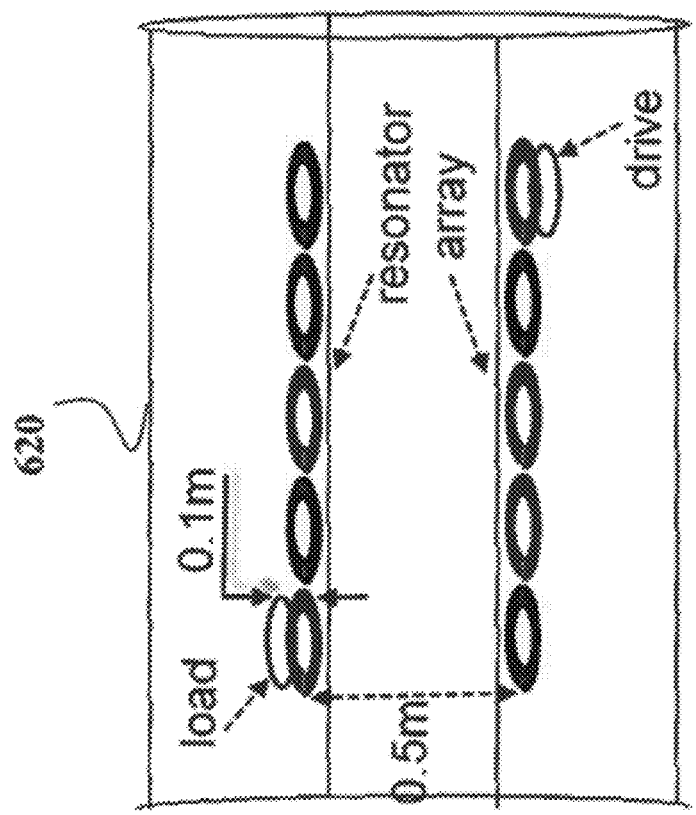
FIGS. 6A-C are schematics comparing different implementations of a sink.
Figure 6B:
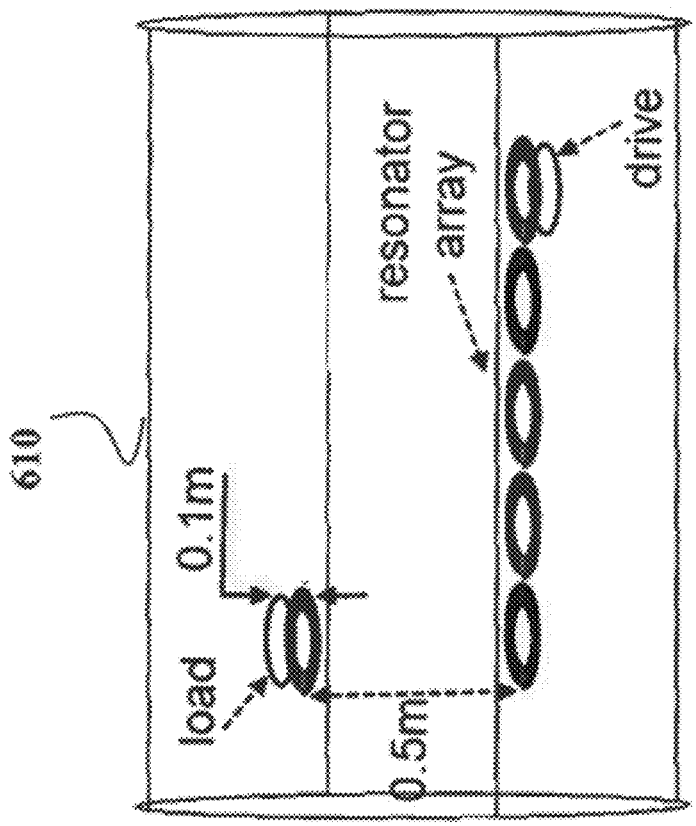

Some embodiments of the invention use the sink formed by an array of resonators. FIGS. 6A-6B show examples of systems 610 and 620 having different sink configurations. In both systems, the source is constructed by spirals aligned in a linear array. A loop antenna is used at the driver to provide energy to the resonant spiral at one end of the array. In the system 610, the sink is an identical spiral resonator and is aligned coaxial with the resonant spiral at the other end of the array. The sink is 0.5 m away from the plane of the array. A loop antenna is used to extract energy from the sink. In system 620, the sink is constructed by an array of identical spirals. A loop antenna is aligned coaxial with the spiral at one end of the array.

Figure 6C:
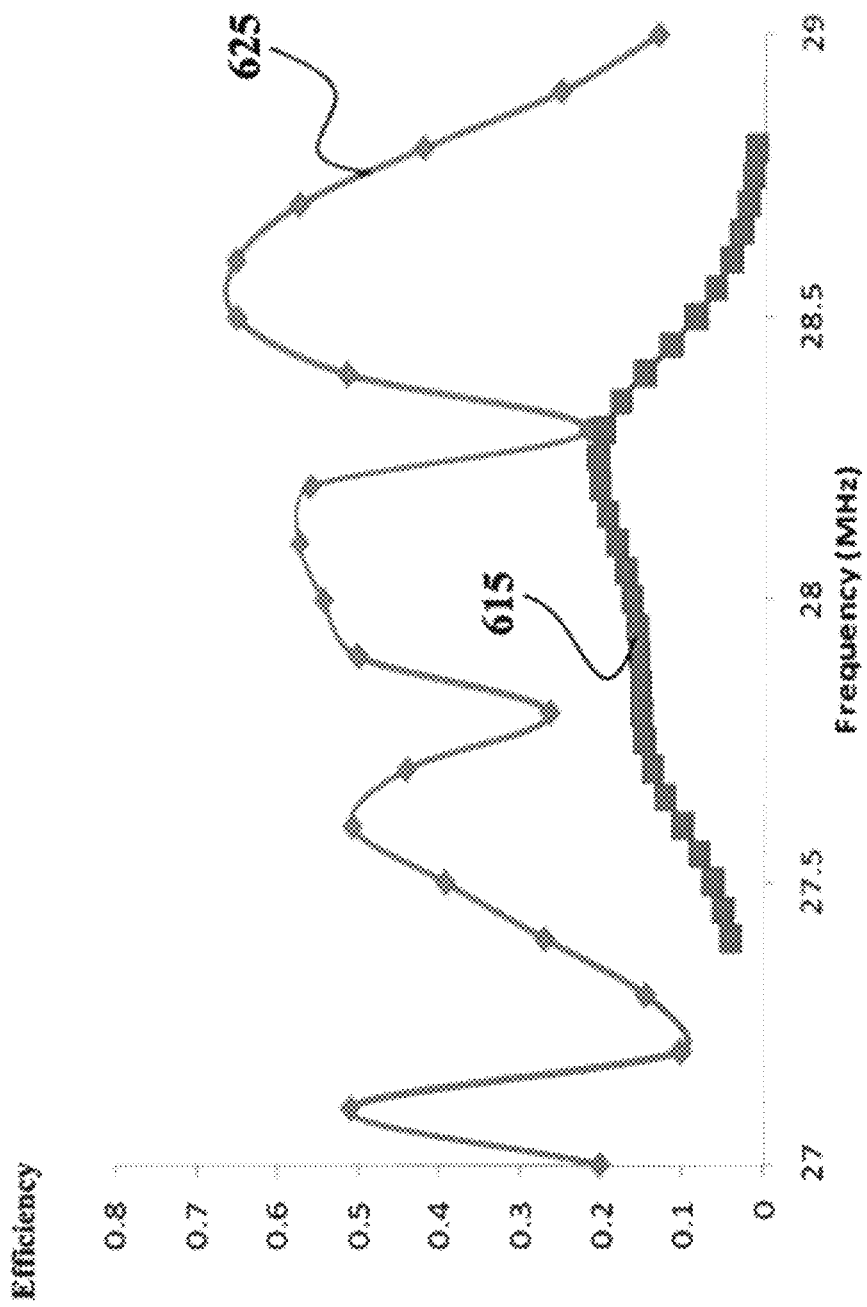

FIG. 6C shows the transfer efficiency 625 of the system 620 is better than the transfer efficiency 615 in the system 610. The distance between the sink and load is 0.1 m.

Two Coupled Resonator Arrays

Figure 7:
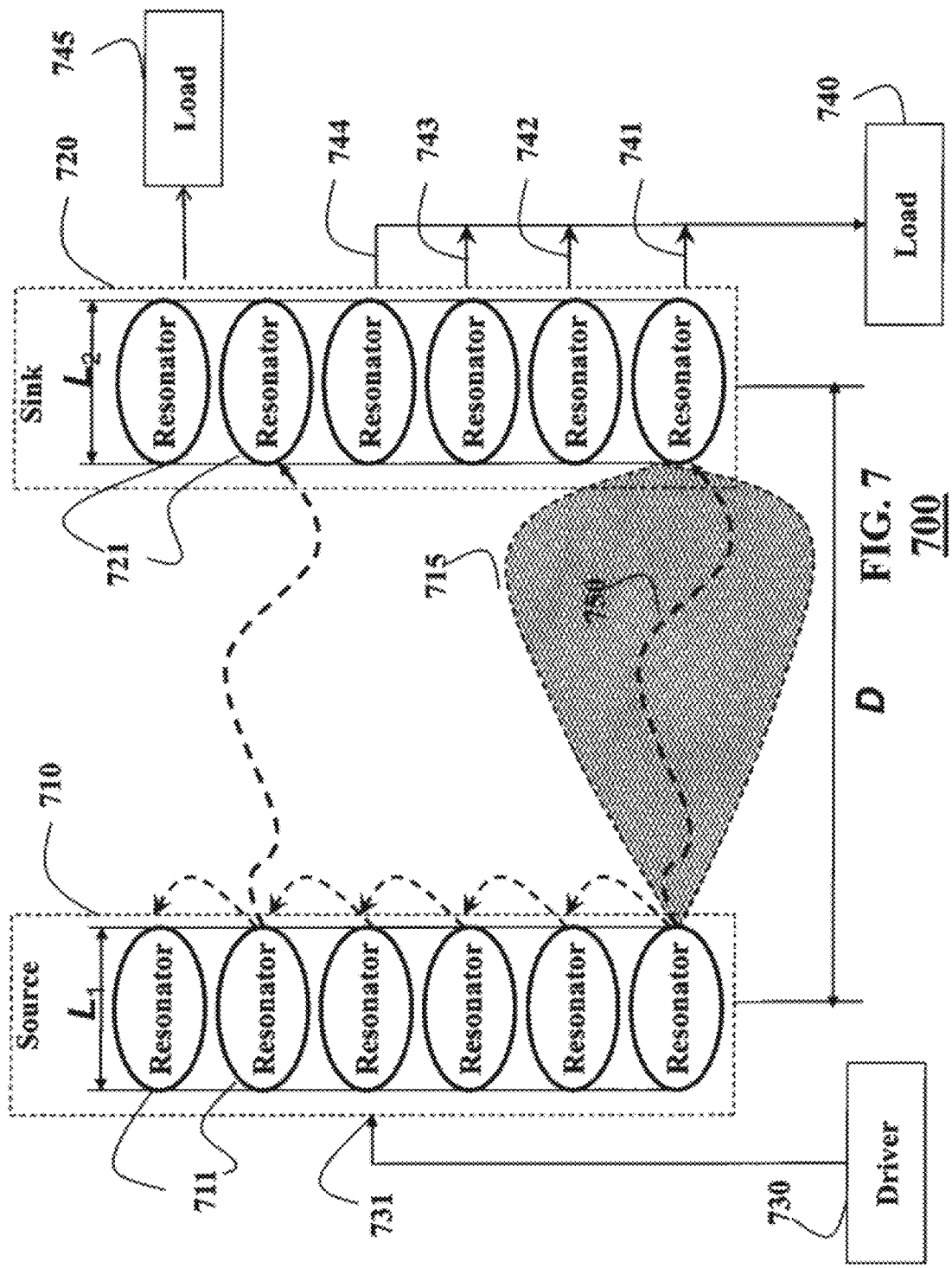
FIG. 7 is a block diagram of a system with a resonator array as the source and the sink according to embodiments of the invention.

FIG. 7 shows a system 700 including a pair of resonator arrays, i.e., a first array 710 and a second array 720, for wireless energy transfer. The energy oscillating at resonant frequency is provided to the source 710 from the drive 730. The energy can be provided wirelessly. The source 710 and the sink 720 are arrays of resonant objects 711 and 721. Mutual coupling between the resonant objects in the source and the sink redistributes the wireless energy in the system according to the resonant arrays configuration. Typically, the distance between objects of, respectively, the first and the second arrays, is less than a distance between the source and the sink.

The mutual coupling between the arrays 710 and 720 supports the wireless energy transfer through the near field 750 over mid-range, e.g., several resonant object dimension size. The energy is transferred from the source to the sink via coupling of one or more resonant objects in the source with one or more resonant objects in the sink. The overall filed distribution due to the mutual coupling forms a coupled mode of the two resonator arrays of a single system.

In various embodiments, the resonant objects 711 and 721 are of different shape and geometry. The resonant frequency can vary between the source and the sink. However, one embodiment maintains the same resonant frequency for both resonant objects 711 and 721 in order to achieve the optimum energy transfer efficiency.

In various embodiments, a size of the first array is less, greater, or equal a size of the second array. The first and the second arrays can be of the same or different dimensions. The first and the second arrays can have the same or different degrees of freedom. In one embodiment, the second array has at least one degree of freedom.

In some embodiment, the driver can provide energy to one or to several resonant objects concurrently. Also, in one embodiment, a driver feeding position 731 can move. The system resonating frequencies and the resonant mode for each resonant frequency are fixed after the system configuration, i.e., the objects of the source and the sink, are determined. The driver 730 can provide energy to the system at any resonator object 711 in the source 710.

Similarly, in one embodiment, the load energy extraction position can move. The energy can be extracted from any resonant object 721 of the sink. In variation of this embodiment, the load 740 can extract energy from more than one object in the array of the sink, e.g., at different positions 741, 742, 743 and 744.

In some embodiments, multiple drivers in the system 700 can be used to provide energy to the source array 710 at different positions. Similarly, multiple loads 740 and 745 can be used to extract energy from the sink 720 at different positions.

Moving Device

Figure 8:
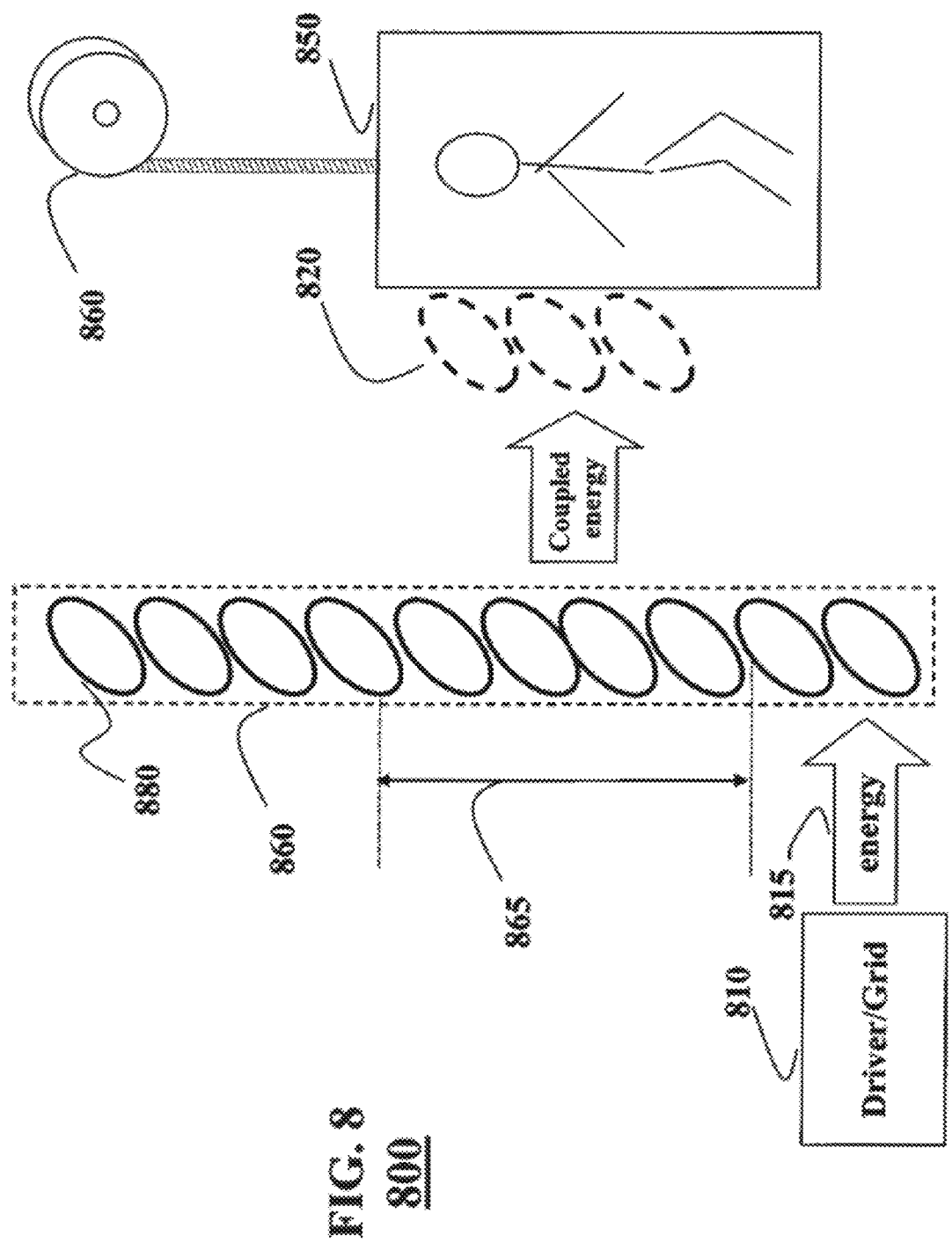
FIG. 8 is block diagram of a system for supplying energy wirelessly to moving objects according to embodiments of the invention.

FIG. 8 shows a system 800 for supplying energy wirelessly to a moving devices, such as elevator cars. The source is an array 860 of resonant objects 880. The source is installed at an elevator shaft and receives energy 815 from an energy driver 810. The energy driver can be connected to a power grid and supply energy to the source, e.g., inductively. The resonator array is configured to generate electromagnetic evanescent fields in the specified resonant mode at specified resonant frequency.

The elevator car 850, i.e., the load, is connected wirelessly to the sink formed by a resonator array 820. The sink can have less, more or the same number of resonant objects as the resonator array of the source.

Example

Figure 9:
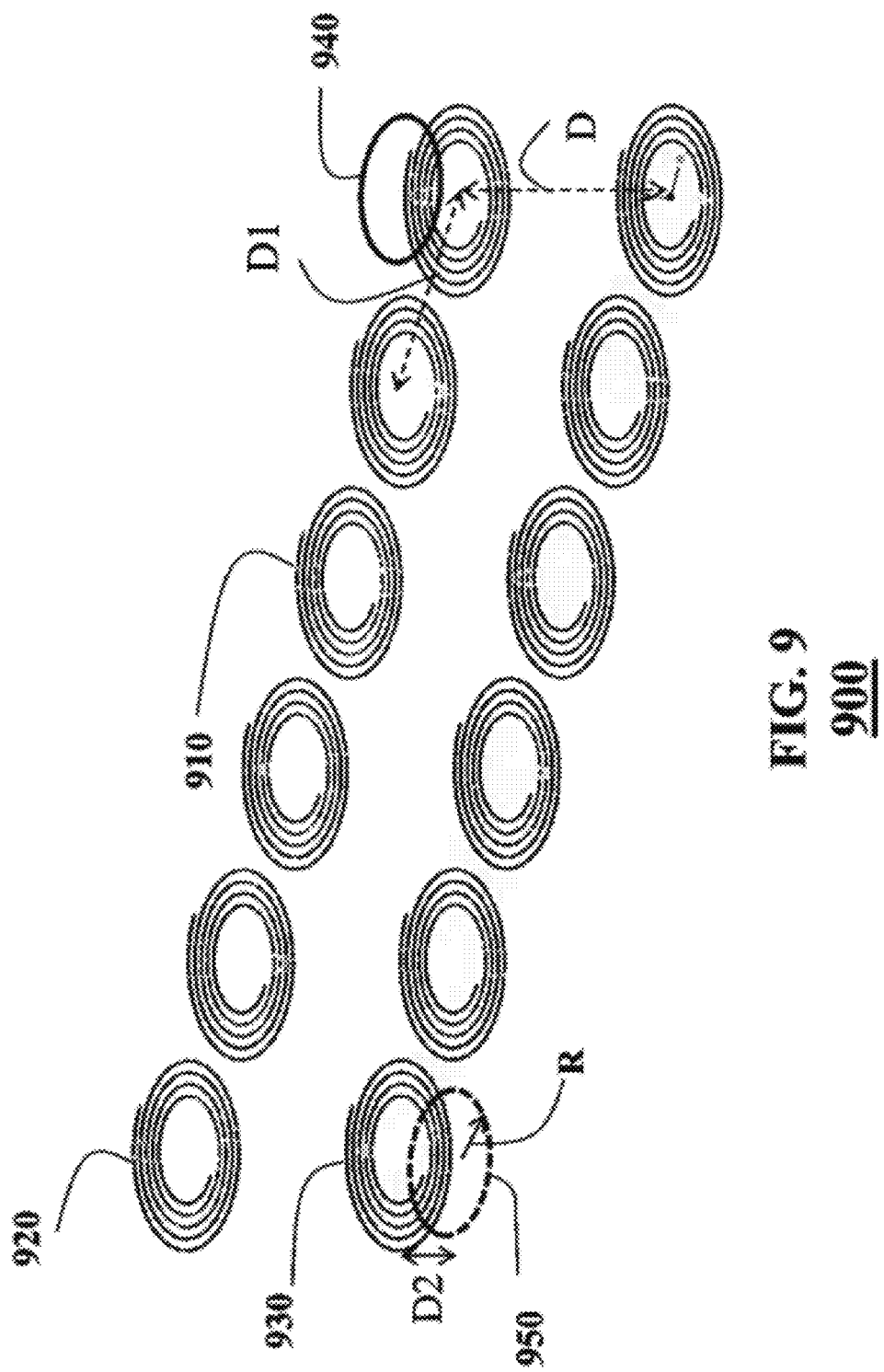
FIG. 9 is a schematic of an array of spiral operating resonators according to embodiments of the invention.

FIG. 9 shows another example embodiment. Spiral resonators 910 resonating at 27 MHz form the resonator arrays of the source 920 and the sink 930. For example, both resonator arrays have six spiral elements separated by a distance D1. Two loop antennas with R radius are used as the energy driver 940 and the load 950. The separation between driver/load and source array/sink array is D2. The distance between the source and sink array is D.

For example, the energy is provided to the energy driver 940 via wired cable and then provided to the source via, e.g., inductive coupling at resonant frequency. The specified resonant mode is excited in the system and the energy redistributed over the whole system according to the resonant mode. The load 950 extracts the energy wirelessly from the sink 930. When the energy is extracted from the system, energy balance of the system is disturbed and more energy is provided from the driver 940 to maintain the balance. Accordingly, the energy transferred from drive 940 to load 950 continues as long as the resonant mode is maintained in the system.

Figure 10A:
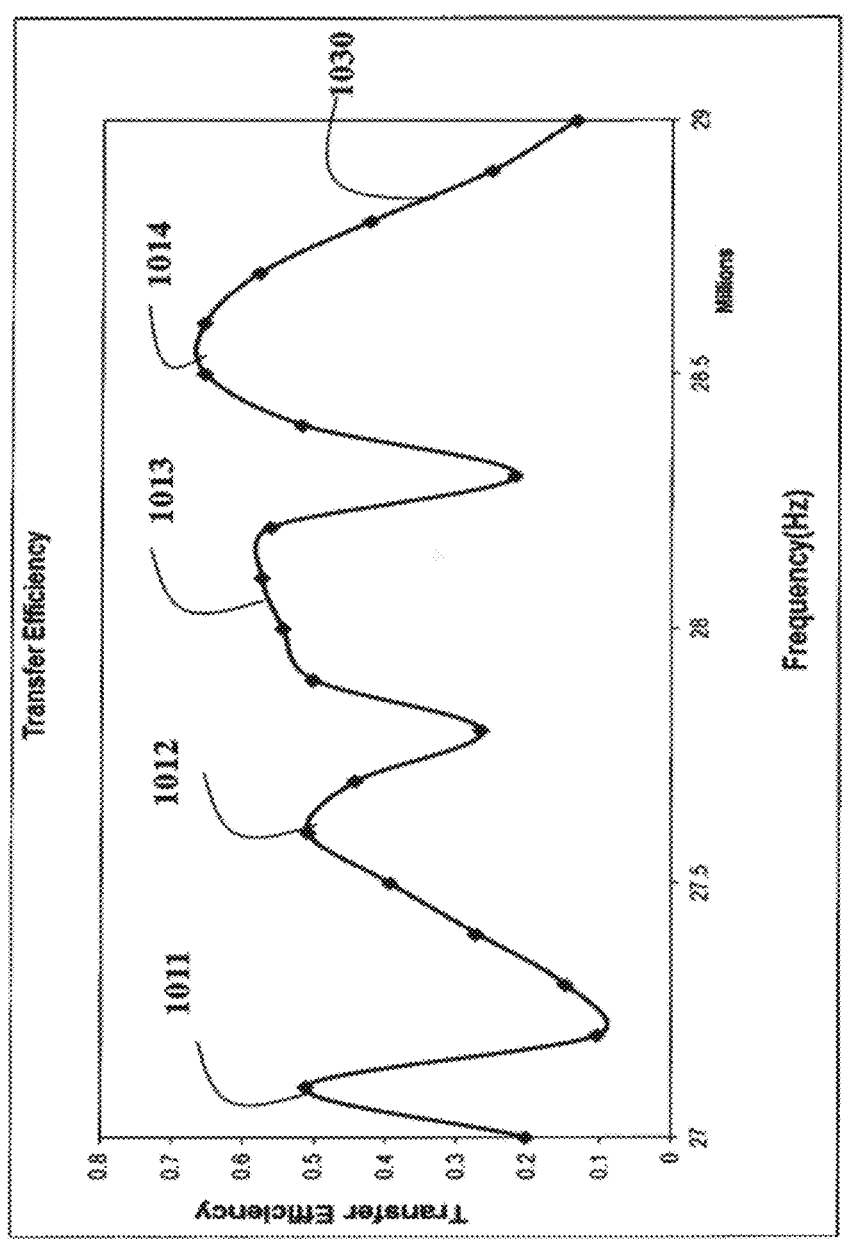

Because the resonant mode of the system is frequency dependent, the transfer efficiency is also frequency dependent, as shown in FIG. 10A. The energy transfer efficiency 1030 has multiple peaks in the system which is the result of the multiple resonator configurations.

Different peaks in the energy transfer efficiency curve, 1011 to 1014, correspond to different corresponding resonant modes 1021 to 1024 as shown in FIGS. 10B-10E. When the resonant mode common to the whole system is excited, the energy is confined within the system with little radiation.

In particular, the highest energy transfer efficiency from the driver to the load is at the resonant mode where the energy is evenly distributed over the all system, which is the peak 1014.

Figure 11:
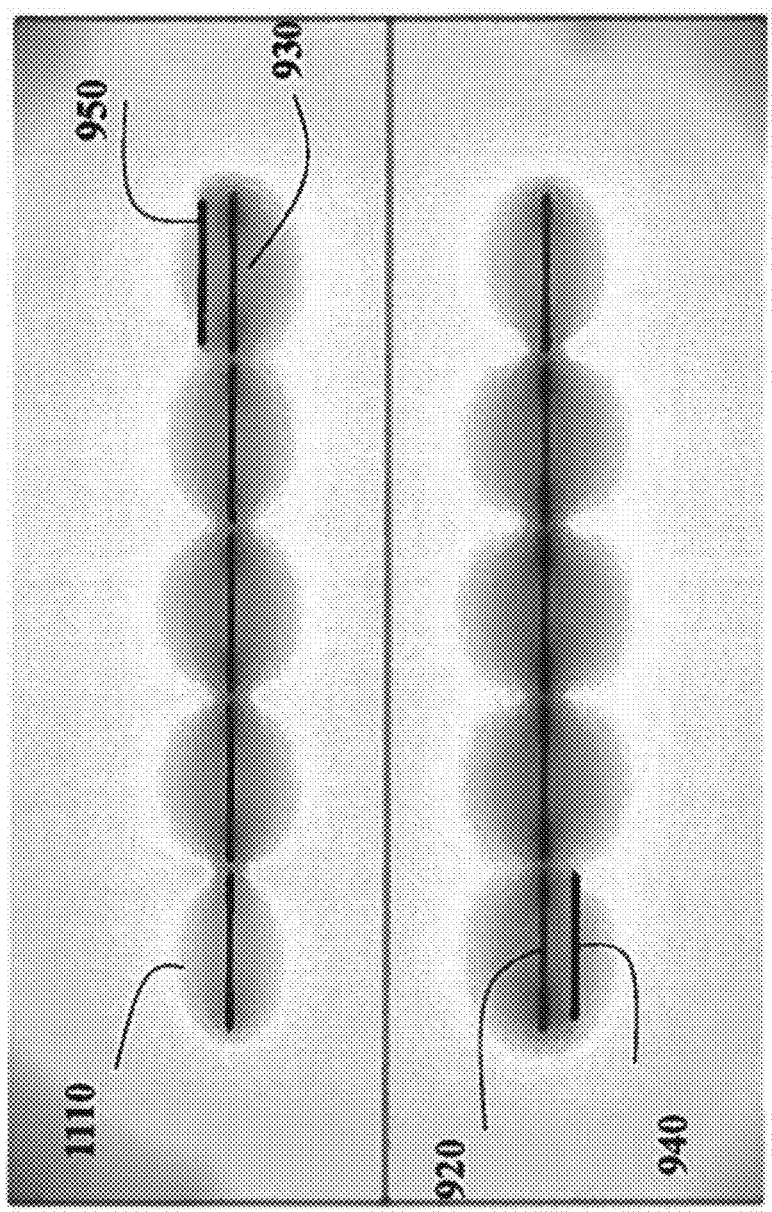
FIG. 11 is a schematic of a field intensity distribution pattern.

FIG. 11 shows the corresponding mode 1110. Each resonator in the source 920 and the sink 930 are excited in this resonant mode, and the energy is evenly distributed oscillating along and between the two arrays.

Two-Dimensional Resonant Arrays

Figure 12:
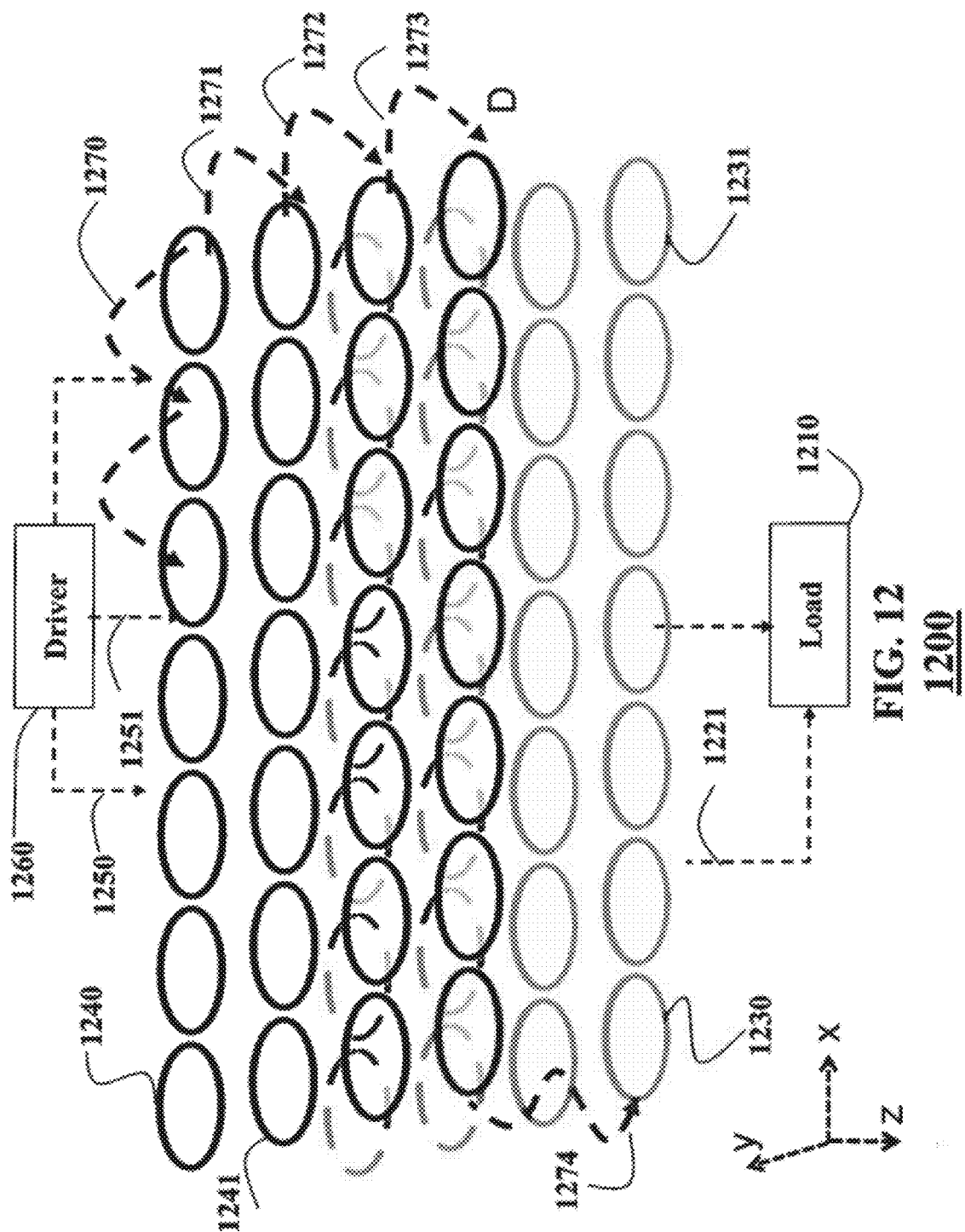
FIG. 12 is a schematic of an example of one dimensional system extended to two dimensional plane systems according to embodiments of the invention.

FIG. 12 shows how the array of resonant objects can be of different dimensions, e.g., a two-dimensional (2D) array of the resonant objects. The 2D arrays extending in both the x and y direction, and is used as the source 1240 and the sink 1230. The energy driver 1260 provides 1250 the energy to the source at the resonant frequency. Due to the mutual coupling, 1270-1273, between the resonant objects in the source, wireless energy redistributed over the system in both direction. The mutual coupling 1274 between the resonant objects in the sources and the resonant objects in the sink results in the wireless energy transfer from the source 1240 to the sink 1230. The corresponding resonant mode of the overall system is excited through the providing energy at the resonant frequency. At the corresponding resonant mode, the energy in the system 1200 is redistributed in 3 directions. Particularly, the energy is transferred wirelessly in the z direction.

Coupling of Two Loops of Metallic Wires

Coupling of electromagnetic (EM) fields is essential in wireless energy transfer based on inductive coupling and resonant coupling. It is important to understand the coupling behavior between EM objects to better design a wireless energy transfer system.

Figure 13:
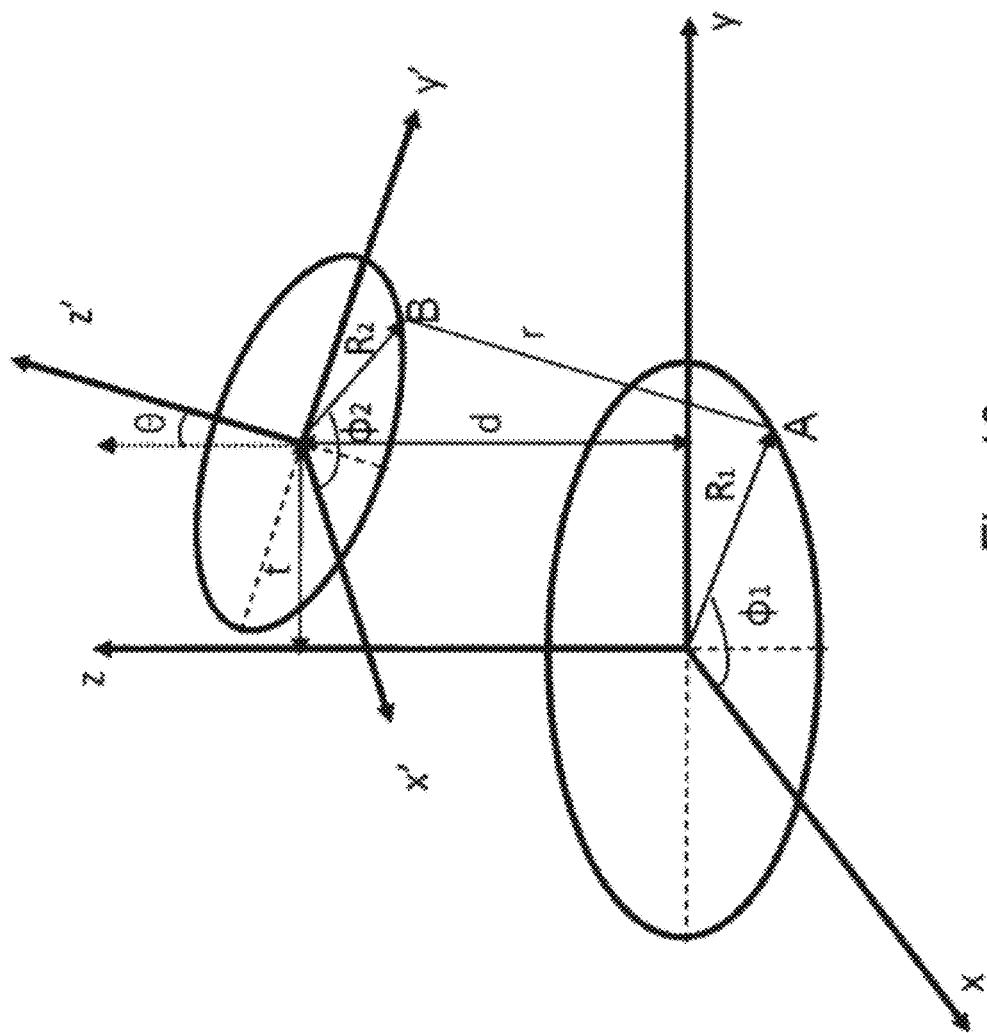
FIG. 13 is a schematic of two circular loops in coordinate system.

We first describe the coupling of two loops of metallic wires. FIG. 13 shows two coupled metallic loops. The positions and geometrical parameters of them are defined in the coordinate system. The mutual coupling of two metallic loops can be described by $$M = \Phi/I_1 = \frac{\mu_0}{4\pi} R_1 R_2 \int_0^{2\pi} \int_0^{2\pi} \frac{(\sin\phi_1\sin\phi_2 + \cos\phi_1\cos\phi_2\cos\theta)}{r} d\phi_1 d\phi_2,$$

where $\Phi$ is the flux of the electromagnetic field going through the second loop due to the electric current $I_1$ the first loop, and $$r = |\vec{x}_A - \vec{x}_B|$$

$$= \sqrt{\begin{array}{l}(R_1\cos\phi_1 - R_2\cos\phi_2)^2 + \\ (R_1\sin\phi_1 - t - R_2\sin\phi_2\cos\theta)^2 + (d - R_2\sin\phi_2\sin\theta)^2\end{array}}.$$

The self-inductance of the two loops are $L_1$ and $L_2$. The coupling coefficient is defined as $k=M/\sqrt{L_1L_2}$. The self-inductance of a metallic loop with radius R is calculated by $$L = \mu_0 R\left[\ln\left(\frac{8R}{a}\right) - 2\right].$$

Figure 14:
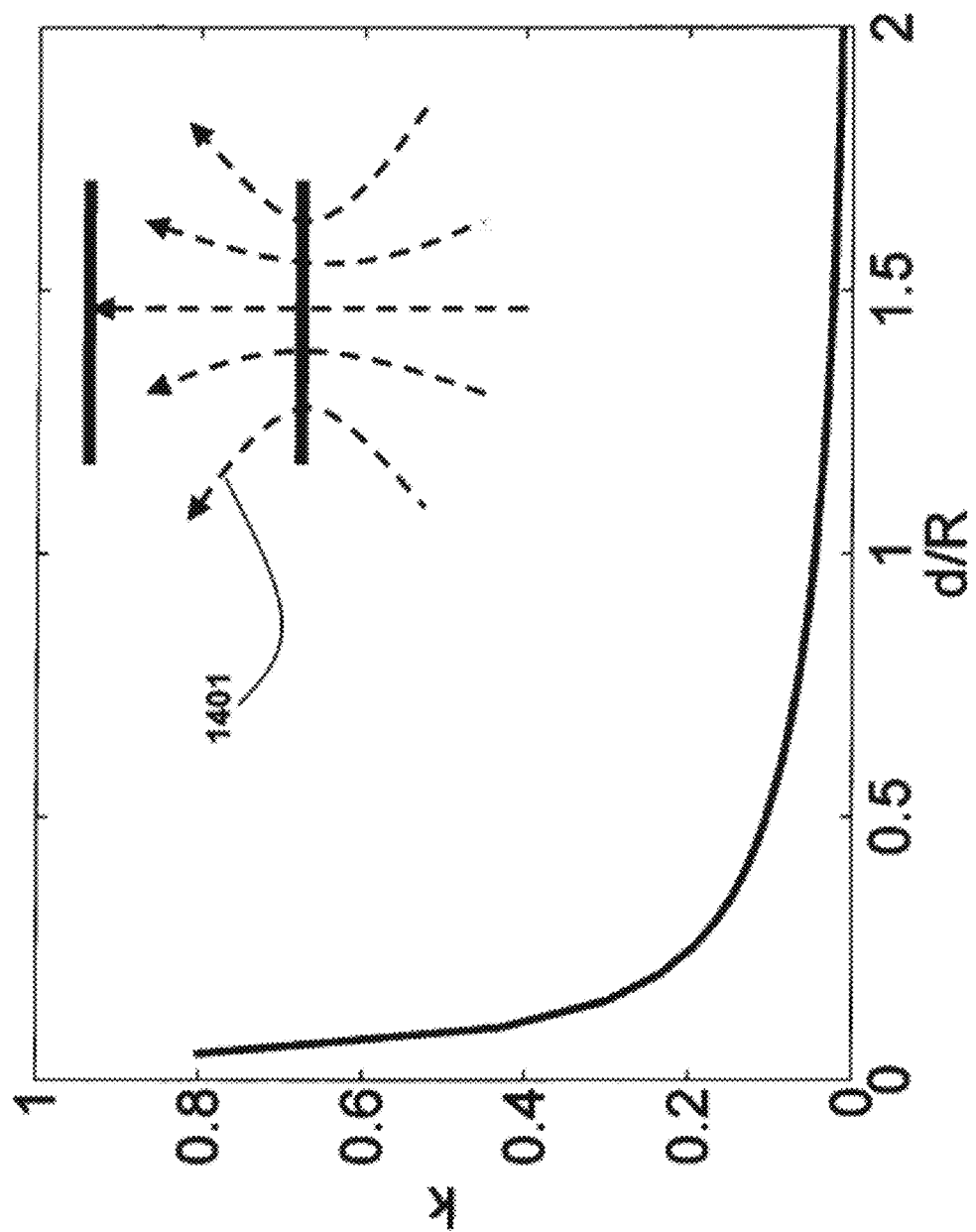
FIG. 14 is a graph of coupling coefficient of two coaxial metallic loops as a function of distance, with an inset of a side view of two loops with a distribution of the flux of the electromagnetic field.
Figure 15:
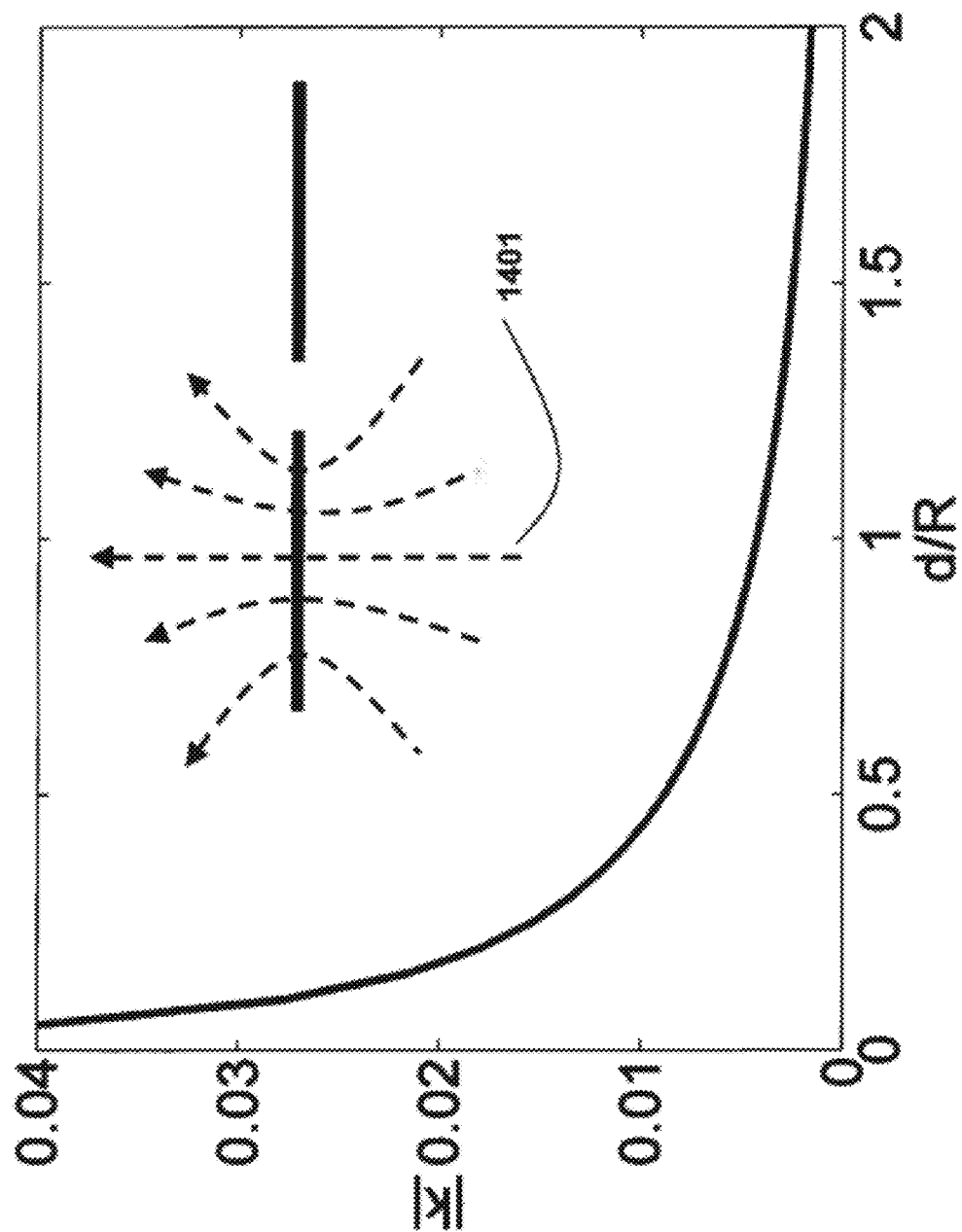
FIG. 15 is a graph of the coupling coefficient of two laterally shifted coplanar metallic loops as a function of distance, with an inset of a side view of two loops with the distributions of the electromagnetic field.

With FIGS. 14 and 15, we describe two special cases of two loops with identical size, with self-inductance $L_1=L_2$. The flux 1401 of the corresponding electromagnetic field is shown in the inset.

When the two loops are coaxial as seen in FIG. 14, with distance d between the loops, the equations are simplified:

$$r = \sqrt{(R_1\cos\phi_1 - R_2\cos\phi_2)^2 + (R_1\sin\phi_1 - R_2\sin\phi_2)^2 + d^2}$$

$$= \sqrt{R_1^2 + R_2^2 - 2R_1R_2\cos(\phi_1 - \phi_2) + d^2},$$

$$M = \frac{\mu_0}{4\pi}R_1R_2\int_0^{2\pi}\int_0^{2\pi}\frac{\cos(\phi_1 - \phi_2)}{\sqrt{R_1^2 + R_2^2 - 2R_1R_2\cos(\phi_1 - \phi_2) + d^2}}d\phi_1d\phi_2.$$

The coupling coefficient is calculated numerically (and plotted as a function of distance in FIG. 14). The coupling coefficient is very strong at short range, when the two loops are close to each other. When the distance is equal to the radius of loop, the coupling coefficient drops to about 0.05. When the two loops are coplanar (as seen in FIG. 15), with distance d between them, the equations are simplified:

$$r = \sqrt{(R_1\cos\phi_1 - R_2\cos\phi_2)^2 + (R_1\sin\phi_1 - R_2\sin\phi_2 - t)^2}$$

$$= \sqrt{R_1^2 + R_2^2 - 2R_1R_2\cos(\phi_1 - \phi_2) + t^2 - 2t(R_1\sin\phi_1 - R_2\sin\phi_2)},$$

$$M = \frac{\mu_0}{4\pi}\int_0^{2\pi}\int_0^{2\pi}\frac{R_1R_2\cos(\phi_1 - \phi_2)}{\sqrt{R_1^2 + R_2^2 - 2R_1R_2\cos(\phi_1 - \phi_2) + t^2 - 2t(R_1\sin\phi_1 - R_2\sin\phi_2)}}d\phi_1d\phi_2.$$

The coupling coefficient is calculated numerically and plotted as a function of distance in FIG. 15. The coupling coefficient is already very weak even when the two loops are side-by-side. When the distance is equal to the radius of loop, the coupling coefficient drops to less than 0.005.

The above analysis indicates that coupling coefficient for two metallic loops is much weaker in coplanar case than in coaxial case; and decreases rapidly with increasing distance in both cases. The coupling coefficient is proportional to the amount of flux that can go through the second loop due to the current in the first loop. As shown in FIG. 14 and FIG. 15, much more flux 1401 goes through the second loop in the coaxial case than in the coplanar case. In wireless energy transfer system using inductive coupling or resonant coupling, the receiver (or receivers) is usually arranged in coaxial position with the transmitter instead of coplanar with the transmitter to obtain higher energy transfer efficiency and larger transfer distance.

For wireless energy transfer based on inductive coupling, a high coupling coefficient (k>0.9) is usually required to achieve high efficiency; thus good coaxial alignment and very small distance between transmitter and receiver are required. For wireless energy transfer based on resonant coupling, energy can be transferred to receiver via many cycles of resonant transfer of energy between them. Efficient energy transfer can be achieved even without a high coupling coefficient, as long as the energy coupled to the receiver is higher than the energy lost in the coupling in each cycle.

Coupling in Array of Resonant Objects

In a wireless energy transfer system using an array of resonant objects, two or more resonant objects are closely coupled to provide energy to receivers. These objects are not physically or electrically connected, but the energy is distributed between them via resonant coupling of electromagnetic fields.

To obtain high transfer efficiency and larger transfer distance, a receiver is preferably arranged such that the axis of its plane is parallel to those of the transmitting objects (coaxial, or coaxial with a lateral shift). The resonant objects in the array need to be closely-coupled, in order to reduce energy loss due to coupling. In general, when an array of resonant objects is excited at one end the array, more energy is coupled to the other end of the array when the coupling coefficient between neighboring objects is higher. Moreover, due to the hybridization of resonant coupling, the bandwidth is broader yielding a higher coupling coefficient.

Figure 16:
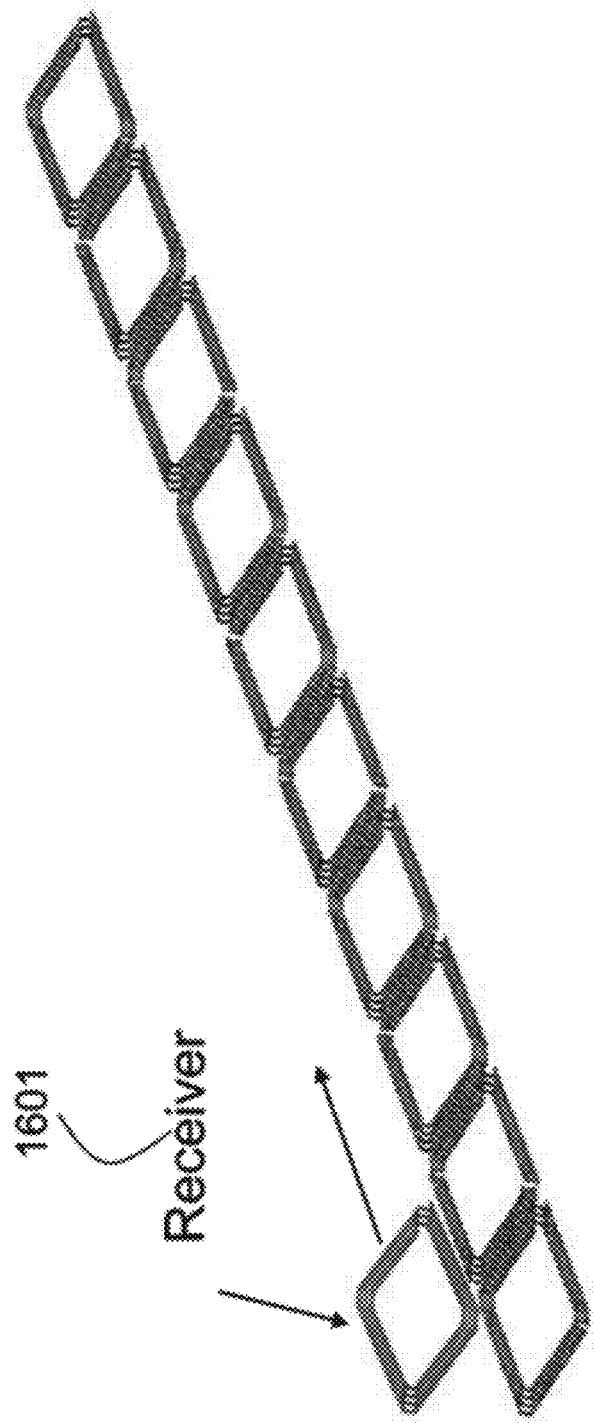
FIG. 16 is an example of wireless energy transfer system with an array of ten resonant objects and another resonant object as receiver.

FIG. 16 shows an example of an array of resonant objects and a receiver 1601. The resonant objects are multi-turn square spiral resonators. The array is made by ten such objects arranged in a linear array. The receiver is also a multi-turn square spiral resonator, arranged in parallel with the array and can move freely along the plane formed by the array. The first object in the array is excited by an external energy source; and energy is distributed in all objects of the array via resonant coupling.

Figure 17:
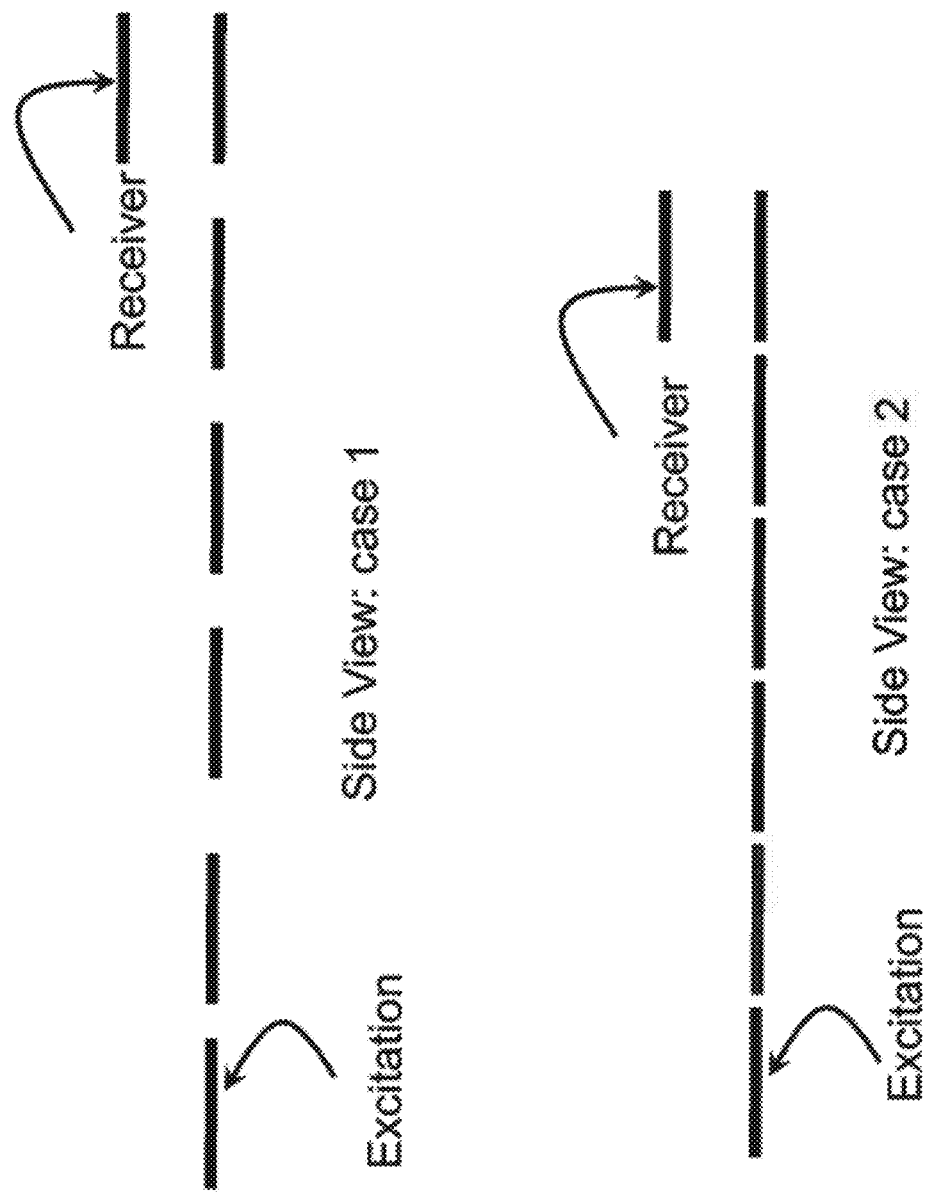
FIG. 17 is side view of the wireless energy transfer system shown in FIG. 16, where the first object is excited by an external source and the receiver is aligned with the last object in the array, with different spacing between neighboring objects on top and bottom Figs.

As shown in FIG. 17, two different spacing 1701-1702 for positions of neighboring objects are used for the array. The energy transfer efficiency, as a function of frequency, is can be determined by simulations. In case 1, the spacing between neighboring objects is 15% of the width of a resonant object. In case 2, the spacing between neighboring objects is only 3% of the width of a resonant object. The distance between the receiver and the plane of the array is 50% of the width of a resonant object.

Figure 18:
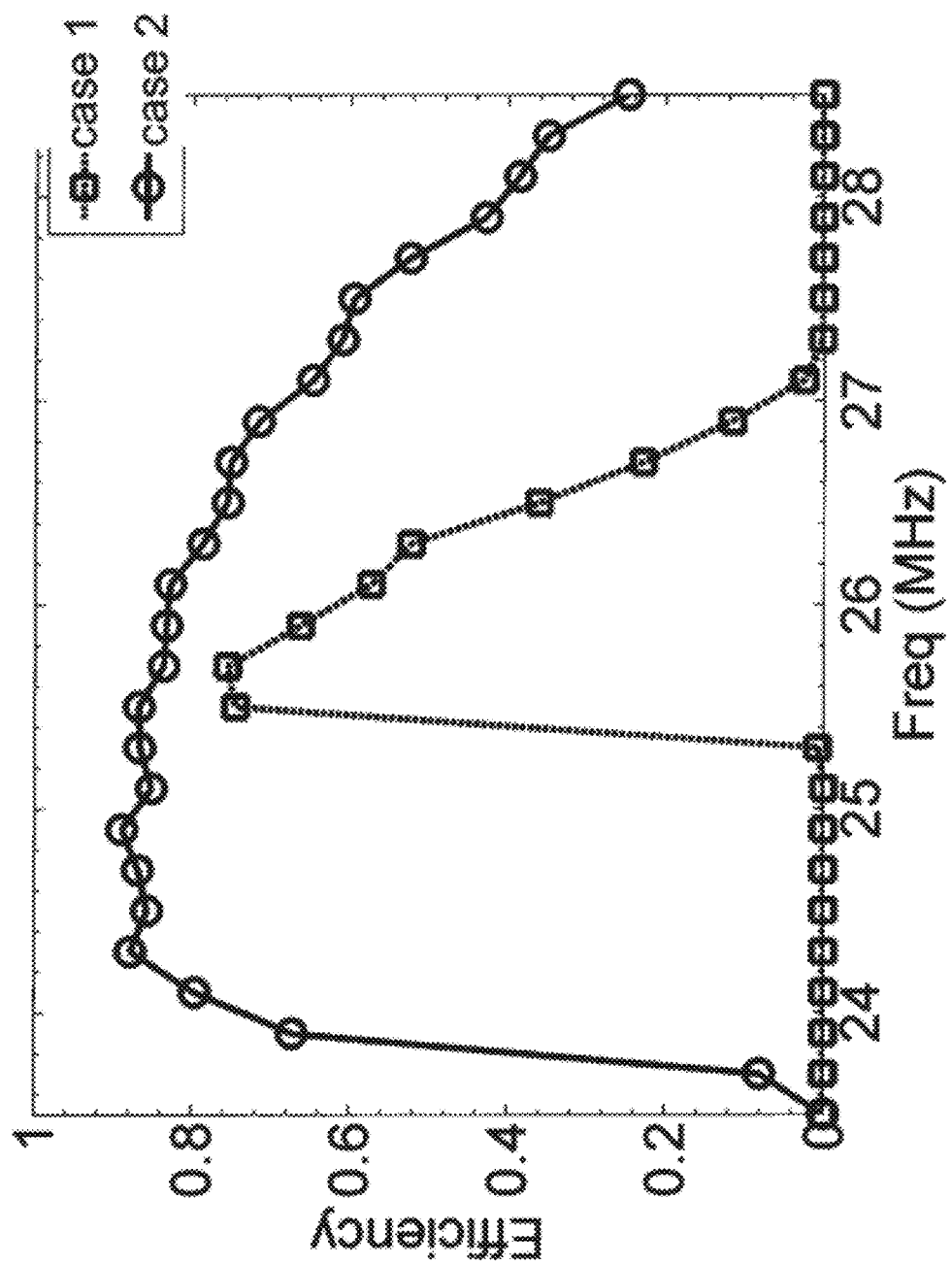
FIG. 18 is a graph of energy transfer efficiency as a function of frequency, for the two cases shown in FIG. 17.

FIG. 18 shows the energy transfer efficiency as a function of the frequency for the two cases in FIG. 17. The efficiency is higher for all frequencies and the bandwidth is much broader when the array is closely arranged at positions.

Receiver at Different Positions

When a receiving object is at different positions, the coupling between the receiving object and the array is different. As shown in FIG. 19, the coupling from an array 1902 to a receiver 1901 is stronger when the receiver is aligned with one object in the array. In comparison, when the receiver is in the middle of neighboring objects, the coupling is weaker. The flux of the electromagnetic field from the two neighboring objects may have different directions, which cancels out the overall flux going through the receiving object, and causing the coupling coefficient even smaller. Due to the change in coupling coefficient, the energy transfer efficiency changes correspondingly when the receiving object is at different positions.

Moreover, the resonant mode and resonant frequency of the system of the array and the receiver also changes when the receiver changes its position. Working at resonant frequency of the system usually leads to higher energy transfer efficiency than working at other frequencies. So, as the receiver moves to different positions different positions, the frequency for peak energy transfer efficiency also varies. Hence, it is desired to tune the frequencies depending on the relative positions of the array and the receiver.

FIG. 20 shows a side view of an array of resonant objects and a receiving object 2010 moving along the direction of the array. The system design is shown in FIG. 16. The distance between receiver and the array is 50% the width of a resonant object in the array. The array is excited by an external source at the first object in the array. The energy transfer efficiency as a function of receiver position is shown in FIGS. 21A-21B.

The receiver position is in units of the period of the array. Zero means the position of the receiver is aligned with the first object in the array. The larger the number, the farther away the receiver is from the first object.

Figure 21B:
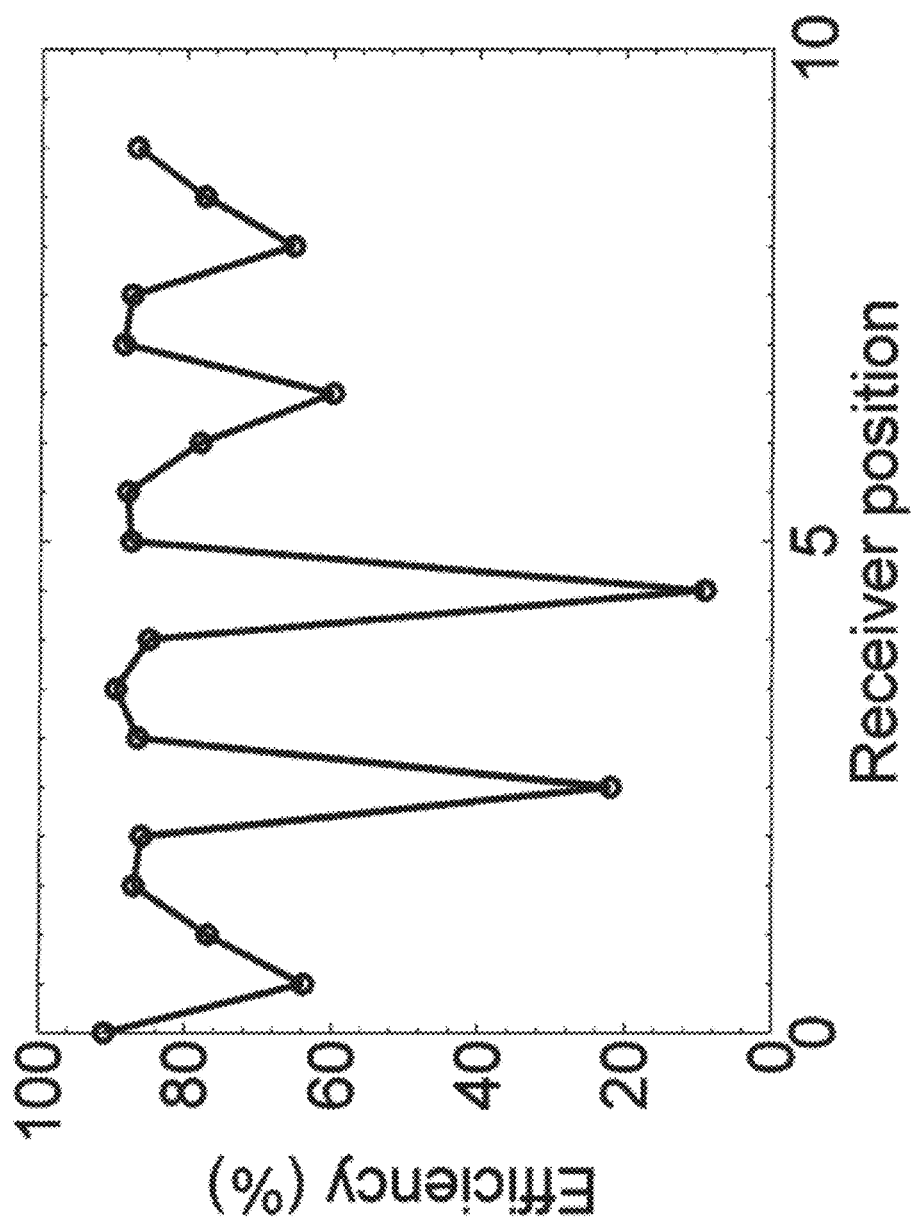
FIG. 21B is a graph of energy transfer efficiency as a function of receiver position at a second frequency.

FIG. 21A and FIG. 21B show plots at two different frequencies. Both Figures show efficiency variation when the receiver travels along the array. In FIG. 21A, the efficiency varies from 85% to 60%. In FIG. 21B, the efficiency varies from 90% to 10%. The variation is more severe in FIG. 21B than in FIG. 21A, which is due to different resonant modes at the two different frequencies.

Figure 21C:
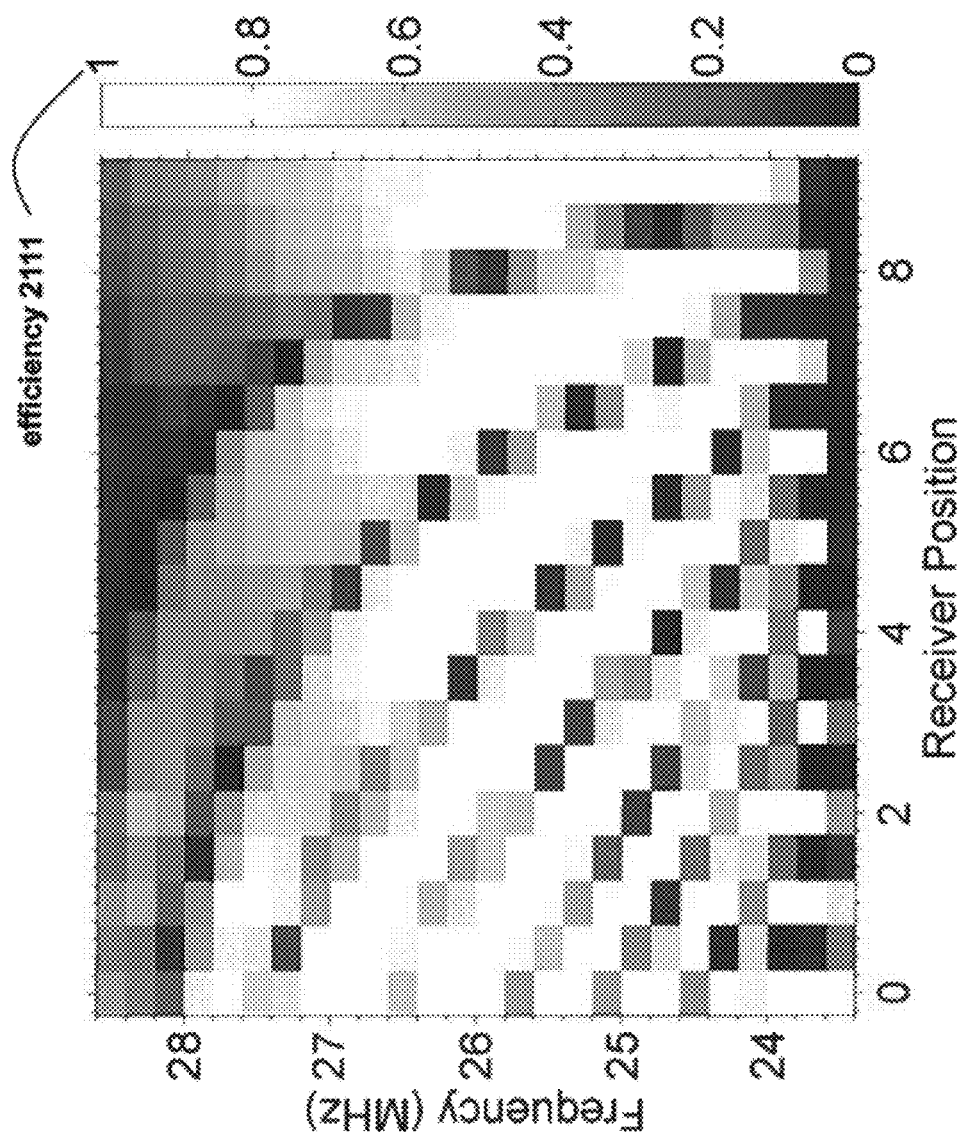
FIG. 21C is a second plot of energy transfer efficiency as a function of receiver position (x-axis) and frequency (y-axis)

The energy transfer efficiency variation at different frequencies when the receiver is at different positions is further shown in FIG. 21C, where the energy transfer efficiency 2111 is plotted as a function of both the receiver position and the frequency. The frequencies for peak energy transfer efficiency changes at different positions.

Therefore, it is desired ways to reduce the fluctuation for wireless energy transfer using array of resonant objects.

Optimizing Electromagnetic Field Characteristics

The electromagnetic field has frequency and phase characteristics. The embodiments of the invention enable the tuning of these characteristics depending on relative positions of the source with respect to the array. This can be done three ways.

Transmission Frequency Tuning

One way to improve the performance of a wireless energy transfer system with an array of resonant objects is to tune the frequency of the electromagnetic field depending on the relative position of the receivers with respect to the array. When the receivers are at different positions, the frequency for highest energy transfer efficiency changes. If the frequency can be tuned to this desired frequency for all positions, then the performance of the system is improved.

Figure 22A:
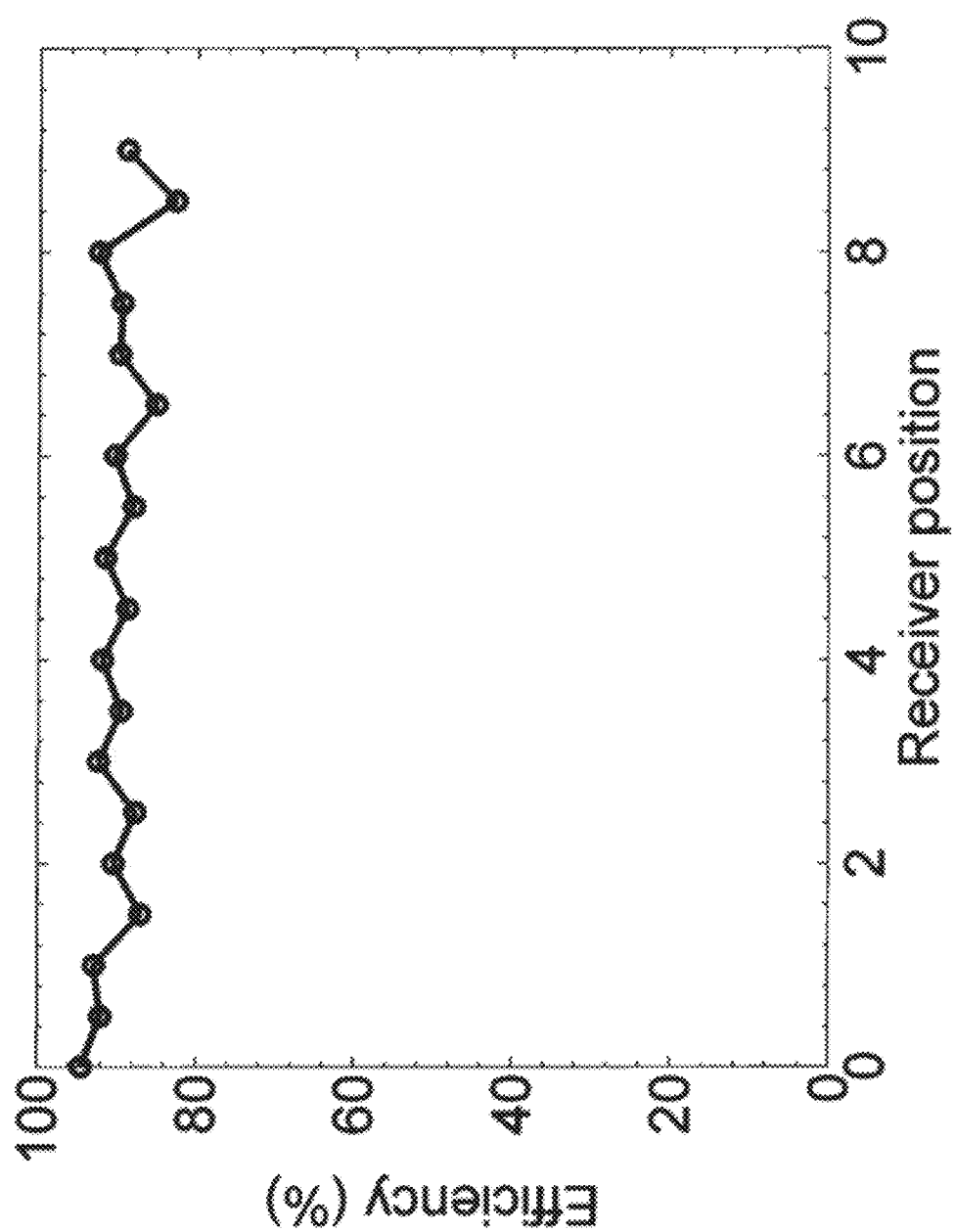
FIG. 22A is a graph of energy transfer efficiency as a function of receiver position when the frequency is tuned to reach maximum efficiency at each position.

FIG. 22A shows the energy transfer efficiency of the system as shown in FIG. 16, as a function of receiver relative position with respect to the array. In this embodiment the frequency is tuned to the optimal frequency to obtain a highest energy transfer efficiency at all positions. The efficiency is above 80% for all positions, and the variation of efficiency is less than 10%. Here, the performance improvement is better when compared with the performance shown in FIG. 21.

Figure 22B:
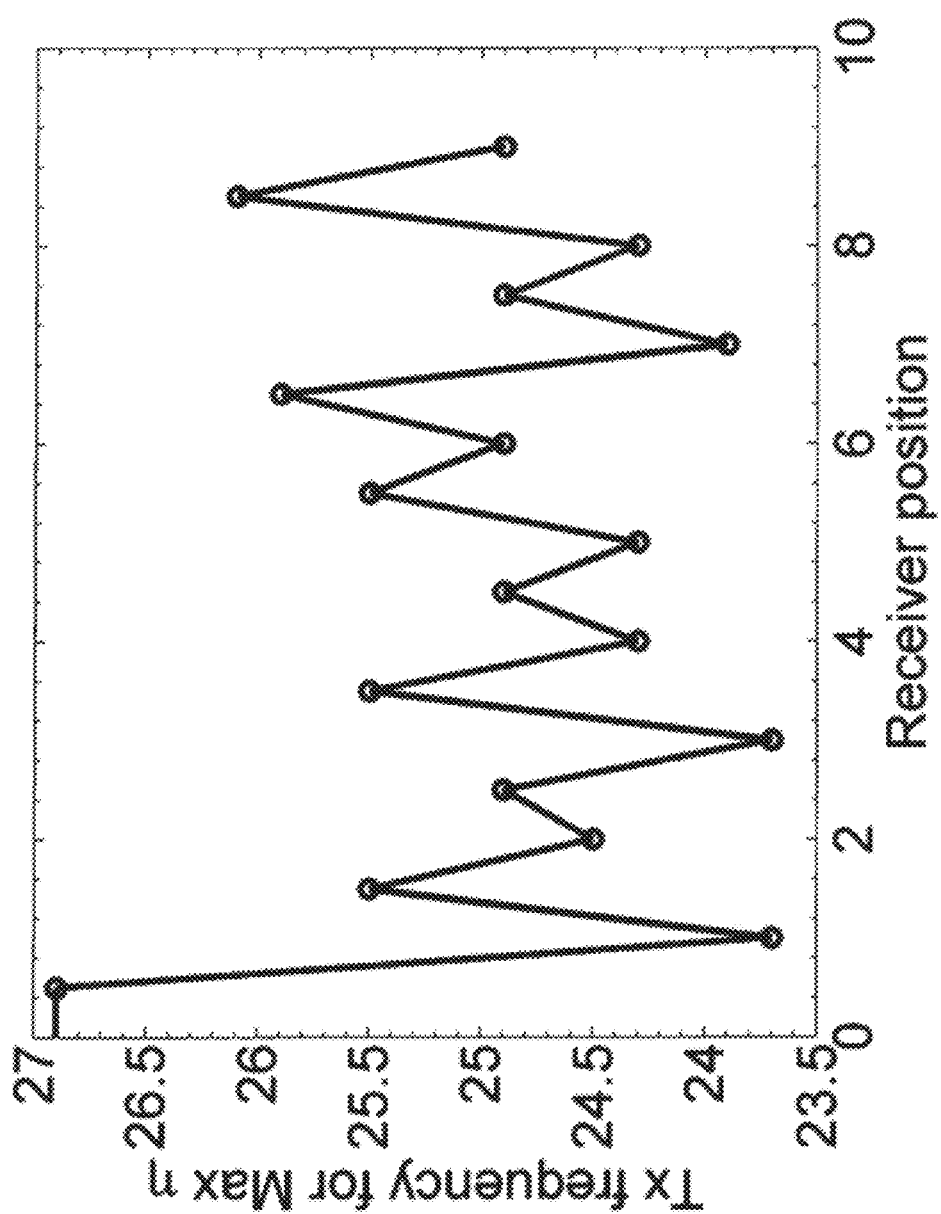
FIG. 22B is a graph of corresponding frequency as a function of receiver position.

FIG. 22B shows the frequency for each receiver position.

Figure 23:
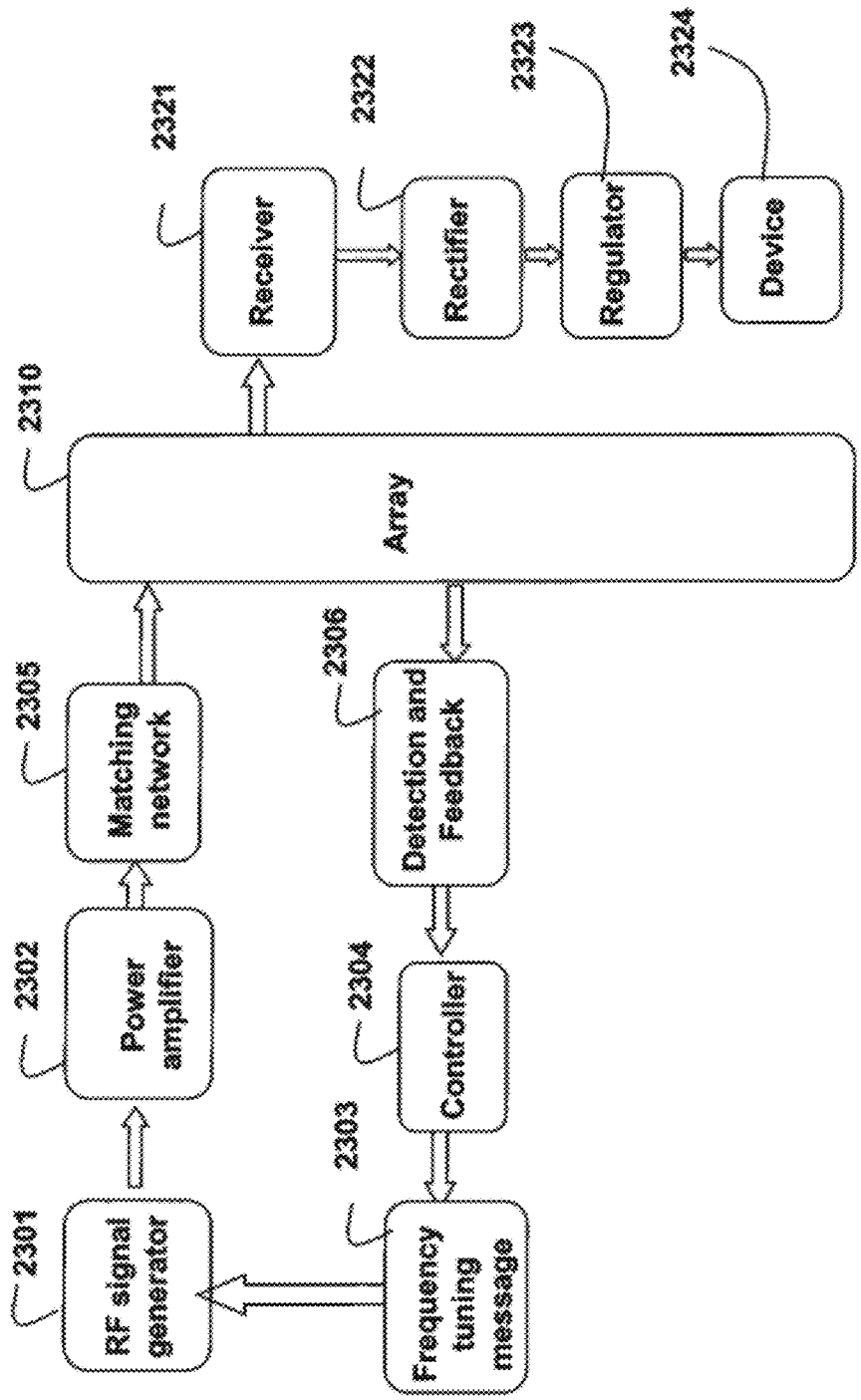
FIG. 23 is a block diagram of a wireless energy transfer system with an array of resonant objects, with resonant frequency tuning of an electromagnetic field at source.

FIG. 23 shows an embodiment of wireless energy transfer system with an array of resonant objects 2310. Frequency tuning at the source is used to generate the signal at a desired frequency. An RF generator 2301 is connected to an amplifier 2302 to achieve a desired power level, and a matching network 2305 for impedance matching. Impedance matching maximize the power transfer and/or minimize reflections.

The high-frequency energy is provided to the array of resonant objects 2310. A receiver 2321 receives energy from the array. The received RF energy passes through a rectifier 2322 and regulator 2322 to power a device (load) 2324.

As used herein, power is the rate at which the energy is converted to perform work.

To tune the operating frequency depending on the relative position of the receiver with respect to the array for efficient energy transfer, a detection and feedback module 2306 is used to detect feedback and send the information to a controller 2304, which then processes the feedback information and sends a frequency tuning message 2303 to the high-frequency signal generator 2301.

Different information can be collected by the detection and feedback system for frequency tuning. In one embodiment, an amount of reflected energy from the array back to the RF source can be monitored, and the frequency is tuned to obtain a lowest reflected energy. The reflected energy depends indirectly of the position of the receiver. In another embodiment, the transmitted energy level, which also depends on the position, to the receiver can be monitored, and the information is send back to the controller for frequency tuning, until the highest energy is transmitted to the receiver. Alternatively, the position of the receiver 2321 relative to the array 2310 can be used directly to tune the frequency.

It is noted that the tuning can be dynamic, and in real-rime as the receiver moves.

Transmission Phase Tuning

An array of resonant objects can be excited by external sources at one or more resonant objects in the array through different excitation ports. The phase and amplitude of each excitation port can be dynamically tuned to achieve high efficiency and reduce efficiency fluctuation when a receiver (or receivers) is at different positions.

By tuning the phase and amplitude of excitation at each port, the EM field distribution in the system of array (or arrays) and receiver (or receivers) can be controlled. The coupling to a receiver (or receivers) at different positions can be optimized by the dynamic tuning.

Thus, optimal power transfer efficiency can be maintained. A second advantage of multiple excitation ports is that losses in the energy due to traversing multiple resonant objects are decreased. With the proper excitation port design, it is possible to insert a "null" area into the array, so that in that part of the array the field strengths become vanishingly small, and receivers (whether intentional or accidental) near that part of the array are not coupled. Thus, one could "turn off" part of the array while it is being serviced, such as in a wirelessly powered vehicle highway network.

Figure 24:
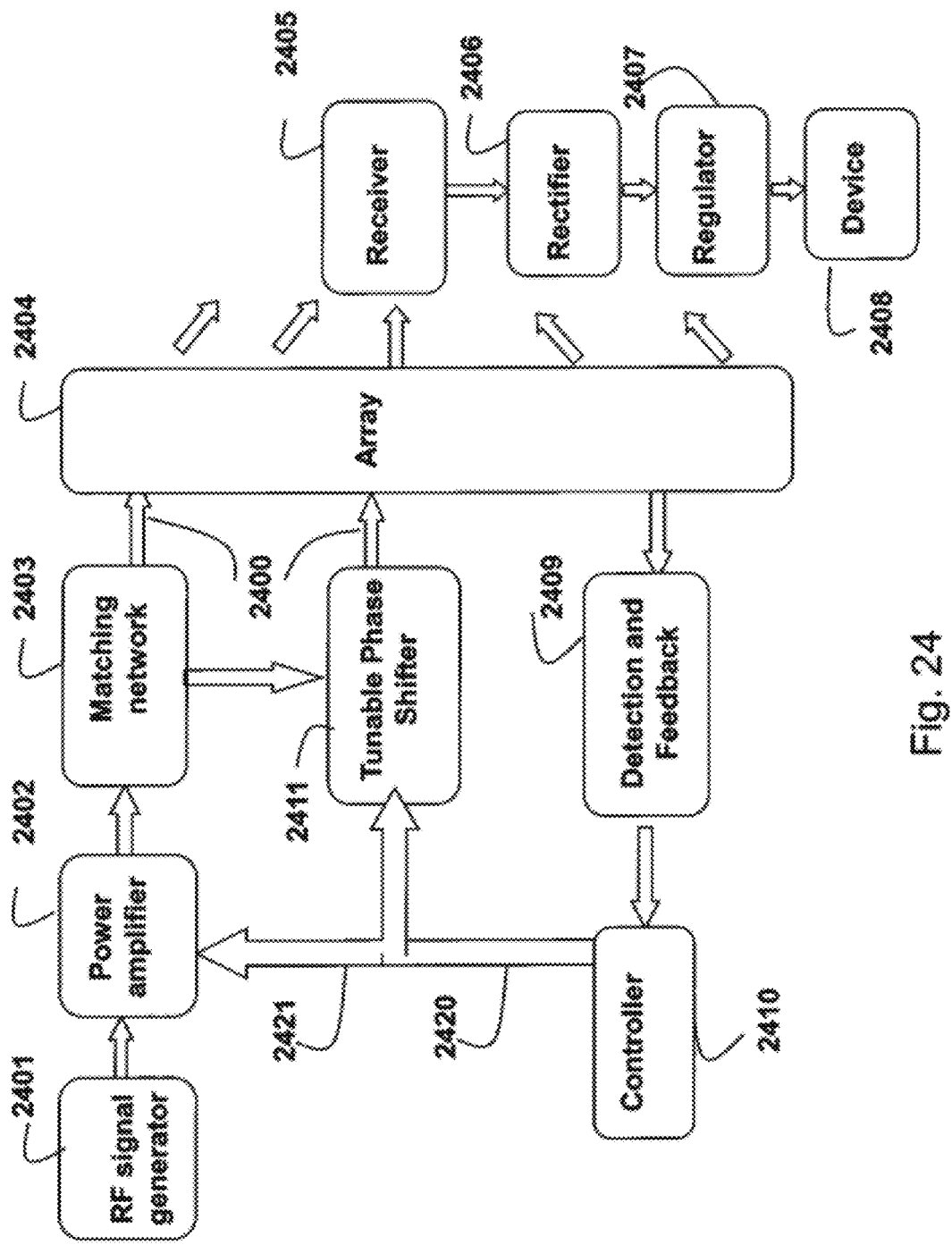
FIG. 24 is a block diagram of a wireless energy transfer system with an array of resonant objects, with resonant phase tuning of an electromagnetic field at a source.

FIG. 24 shows how to improve the performance of a wireless energy transfer system with an array 2404 of resonant objects by varying the phase of the electromagnetic field depending on the relative position of receiver 2405 with respect to the array, while keeping the transmission frequency the same. Two or more feed points 2400 are used to provide energy to the array. The energy distribution on the array is determined by the superposition of electromagnetic field patterns at all feed points.

The phase delay of one or more feed points in the array can be tuned. By tuning the phase, the energy distribution along the array 204 can be varied. When the receiver 2405 is at a position with low energy and low energy transfer efficiency, tuning the phase delay of one or more feed points increases the energy at that position and improves the energy transfer to the receiver. If the phase delay is tuned depending for the receiver at all positions relative to the array, then the performance of the system can be improved.

A high-frequency signal generator 2401 is used to generate the signal at a desired frequency. The signal is fed to a power amplifier 2402 for a desired level, and a matching network 2403 for impedance matching. The high-frequency energy is provided to the array 2404 of resonant objects at multiple feed points.

The phase delay of one or more feed points 2400 can be tuned by a tunable phase shifter 2411 depending on a relative position of the receiver 2405 with respect to the array. The receiver 2405 receives energy from the array 2404. The received RF energy passes goes through the rectifier 2406 and regulator 2407, which is converted to provide power to a device or load 2408.

To tune the phase depending on the receiver position for efficiency energy transfer, a detection and feedback module 2409 is used to detect information of the array system and send the information back to a controller 2410. The controller processes the feedback information and sends phase shift tuning message 2420 to the tunable phase shifter 2411. The controller can also generate an amplitude tuning message 2421.

Different information can be collected by the detection and feedback system for phase shift tuning processing. In one embodiment, the reflected energy from the array back to the RF source can be monitored, and the phase is tuned to get lowest reflected energy. The reflected energy depends on the position of the receiver. In another embodiment, the energy received by the receiver can be monitored, and the information is send back to the controller for phase tuning, until the highest energy is transmitted to the receiver. The position of the receiver relative to the array can also be directly monitored.

Figure 25:
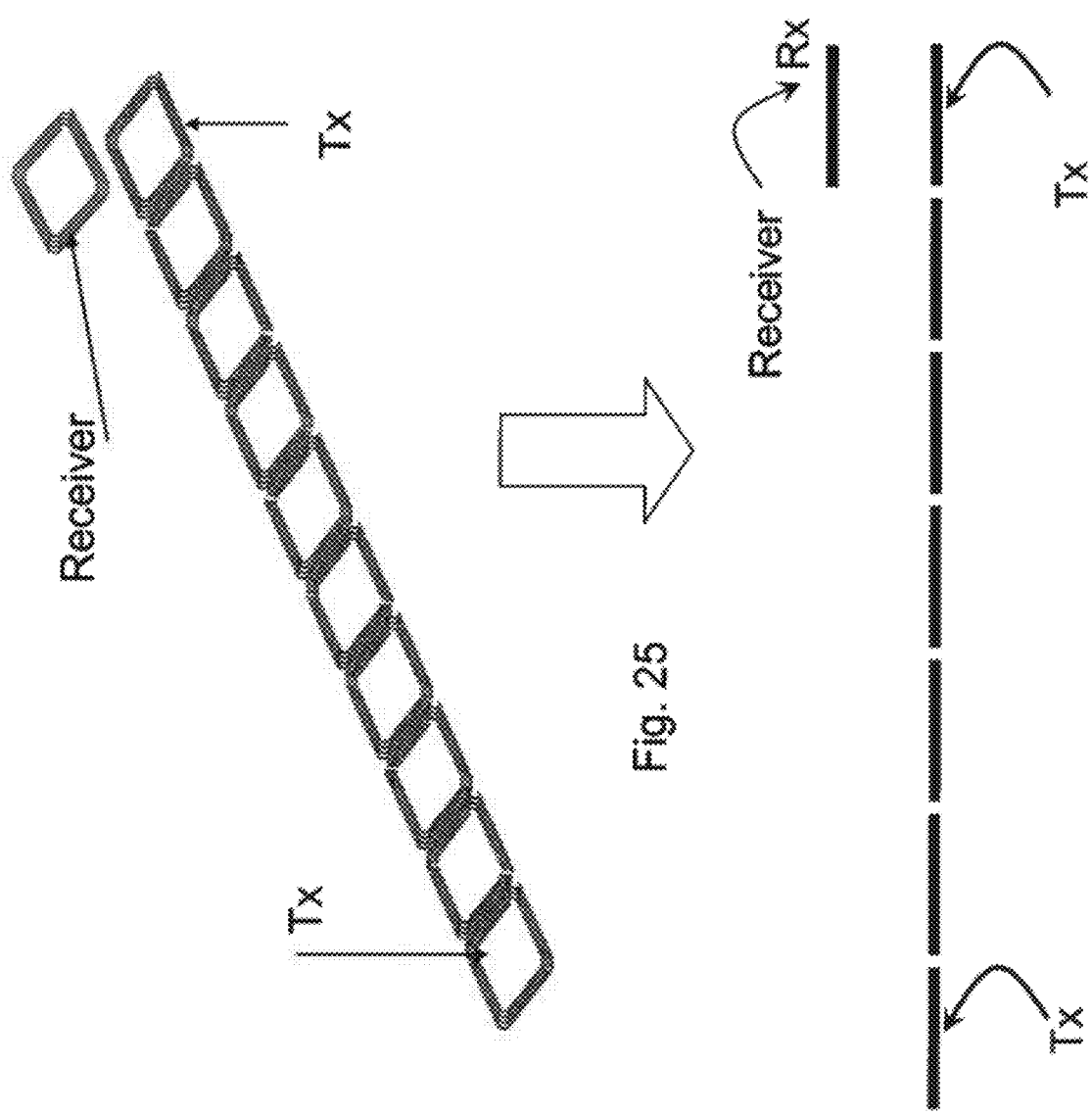
FIG. 25 is a schematic of a phase controlled array with two excitation ports.

FIG. 25 shows an example of a phase controlled array (Tx) and a receiver (Rx). The array has two excitation ports (Tx). The phase of each excitation is tuned to optimize energy transfer efficiency.

Figure 26:
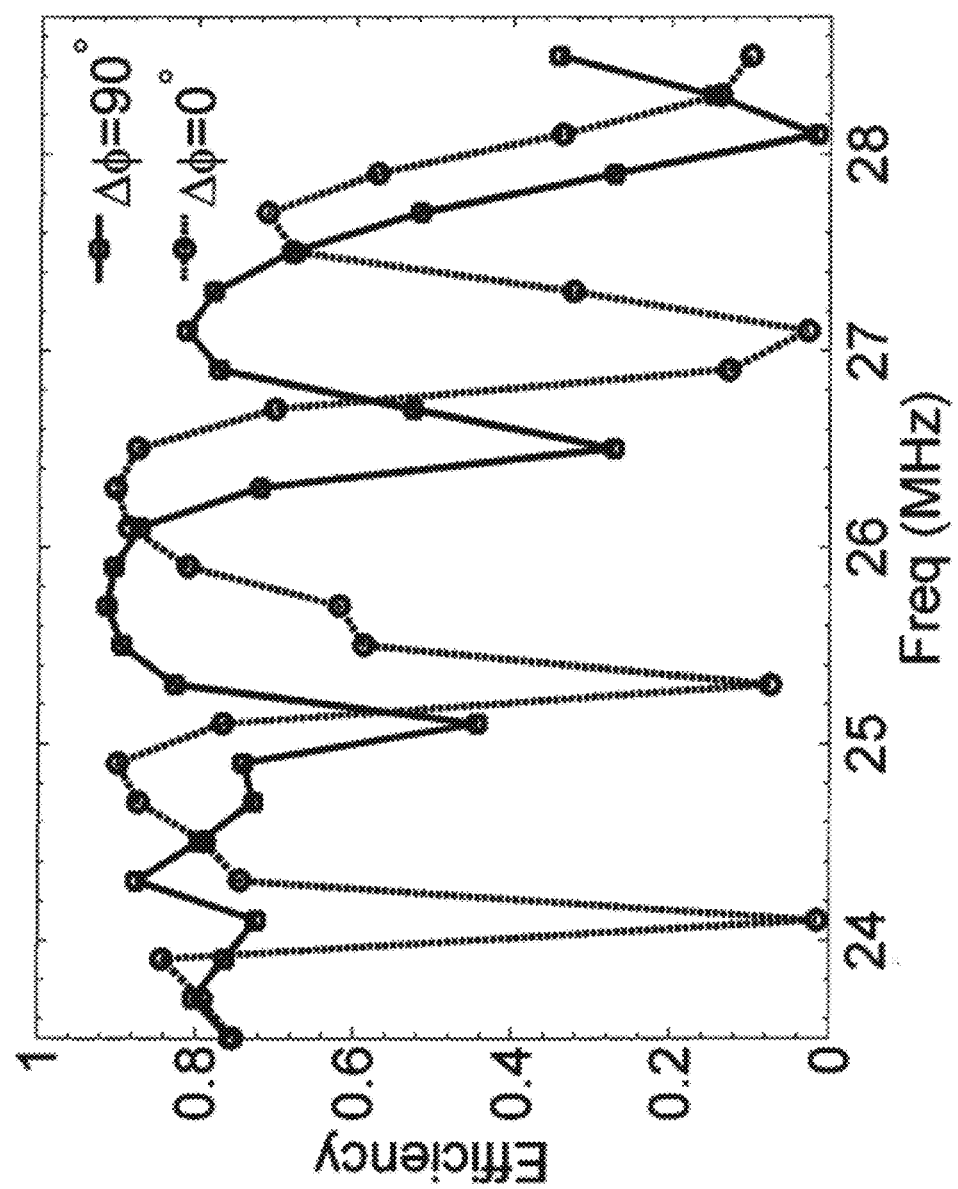
FIG. 26 is a graph of energy transfer efficiency with two excitations with no phase difference and two excitations with 90° phase difference.

FIG. 26 shows energy transfer efficiency for a receiver at the same position. Two cases are considered in FIG. 26: two excitations with no phase difference; and two excitations with 90° phase difference. The efficiency is different for the two cases. When the excitation frequency is fixed, the system can be tuned by changing the phase angle of each excitation to optimize the energy transfer.

Receiver Resonant Frequency Tuning

Another way to improve the performance of a wireless energy transfer system with an array of resonant objects is to tune the resonant frequency of a receiver for best coupling at the frequency of the system.

Figure 27:
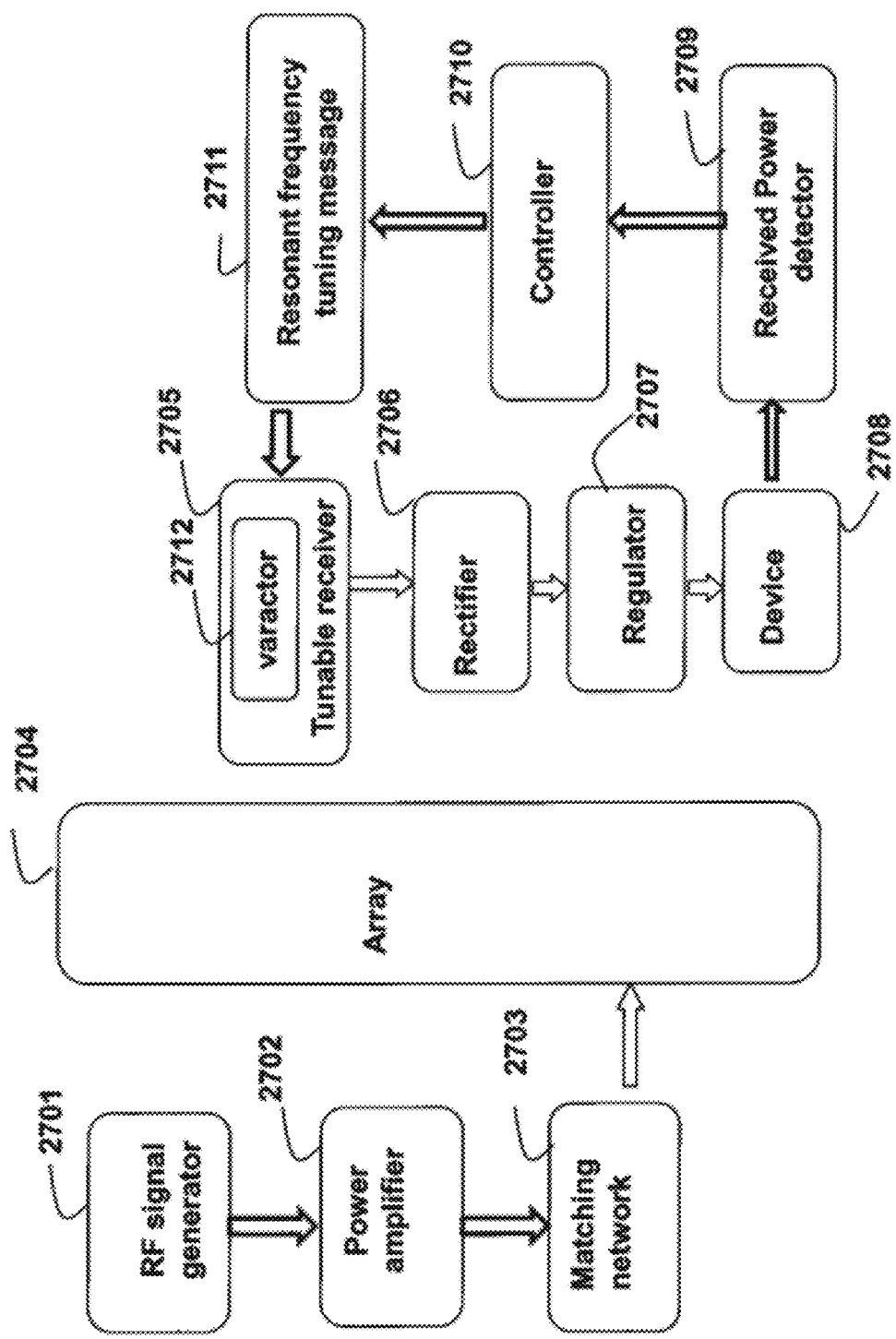
FIG. 27 is a block diagram of a wireless energy transfer system with an array of resonant objects, with resonant frequency tuning of an electromagnetic field at a sink.

FIG. 27 shows an embodiment of wireless energy transfer system with array 2704 of resonant objects, with resonant frequency tuning of a receiver 2705.

A high-frequency RF signal generator 2701 generates the signal at desired frequency. The signal is fed to an amplifier 2702 to desired power level, and a matching network 2703 for impedance matching. The high-frequency energy is provided to the array 2705 of resonant objects.

A tunable receiver 2705 receives energy from the array. The received RF energy passes through the rectifier 2706 and regulator 2707 and is converted to power for the device 2708. The received energy is monitored by a detector 2709. The information is then sent to a controlling system 2710, which processes the information and sends resonant frequency tuning message 2711 to the tunable receiver. The process continues dynamically to achieve a highest efficiency.

Different methods can be used to tune the resonant frequency of a receiver. In one embodiment, a varactor 2712 is added to the receiver and the capacitance of the varactor is controlled by a biasing circuit. The resonant frequency of the receiver is tuned by changing the capacitance of the varactor 2712.

In another embodiment, the capacitance, thus the resonant frequency of the receiver can be controlled by a micro-electro-mechanical system (MEMS) device. In yet another embodiment, the capacitance, thus the resonant frequency of the receiver can be controlled by a ferroelectric material.

It is noted that both the frequencies and the phases can be optimized dynamically while the object is moving, as described below.

Dynamic Optimization of Wireless Energy Transfer

In a wireless energy transfer system, the efficiency of the energy transfer is often strongly dependent on a highly non-linear function of operating frequency and positioning of the source and sink, as well as the position of other conductors, reflectors, or multiple power receiving loads in the environment.

This necessitates fixed positioning of the source and the sink for efficiency. However, a moving vehicle powered by wireless energy transfer cannot be fixed in position. Therefore, we describe a system and method for automatically optimizing the efficiency of the wireless energy transfer in the presence of motion of the sinks and loads, and other objects in the environment.

The system works by using a frequency-agile transmitter, able to transfer energy over a significantly wide bandwidth. Each receiver of the energy is provided with a communications link, such as a local RF link, to the controller the wireless energy transmitter, so that each receiver feeds back information to the transmitter both of the local availability of energy, and the local need for power.

The controller in the transmitter optimizes the transmitter frequency, and optionally, other transmitter parameters, such as load phase and load impedance using the matching network. The controller preferably uses a "smart" optimization method, such as initially sweeping continuously through the available frequencies to determine high-quality candidate frequencies, and then preferentially trying those frequencies first when a load requests energy.

In an even more advanced mode for transferring energy uses a memory cache in the controller that stores, for each high-quality candidate frequency, all of the previously determined high-quality frequencies that are most likely to work in the immediate future for a moving receiver. The caching of the most likely frequencies to be tried next is dynamic, and thus, can automatically accommodate changing conditions such as rearrangement of the array, extraneous metal being added or removed from the environment.

Because the feedback informs the transmitters not only of the local availability of energy, but also the local need for power, the transmitter controller can multiplex the available energy across all demands, and selectively route energy to where it is needed, and can accommodate the addition or removal of moving loads, or changing demands of those loads based on the feedback.

Figure 28:
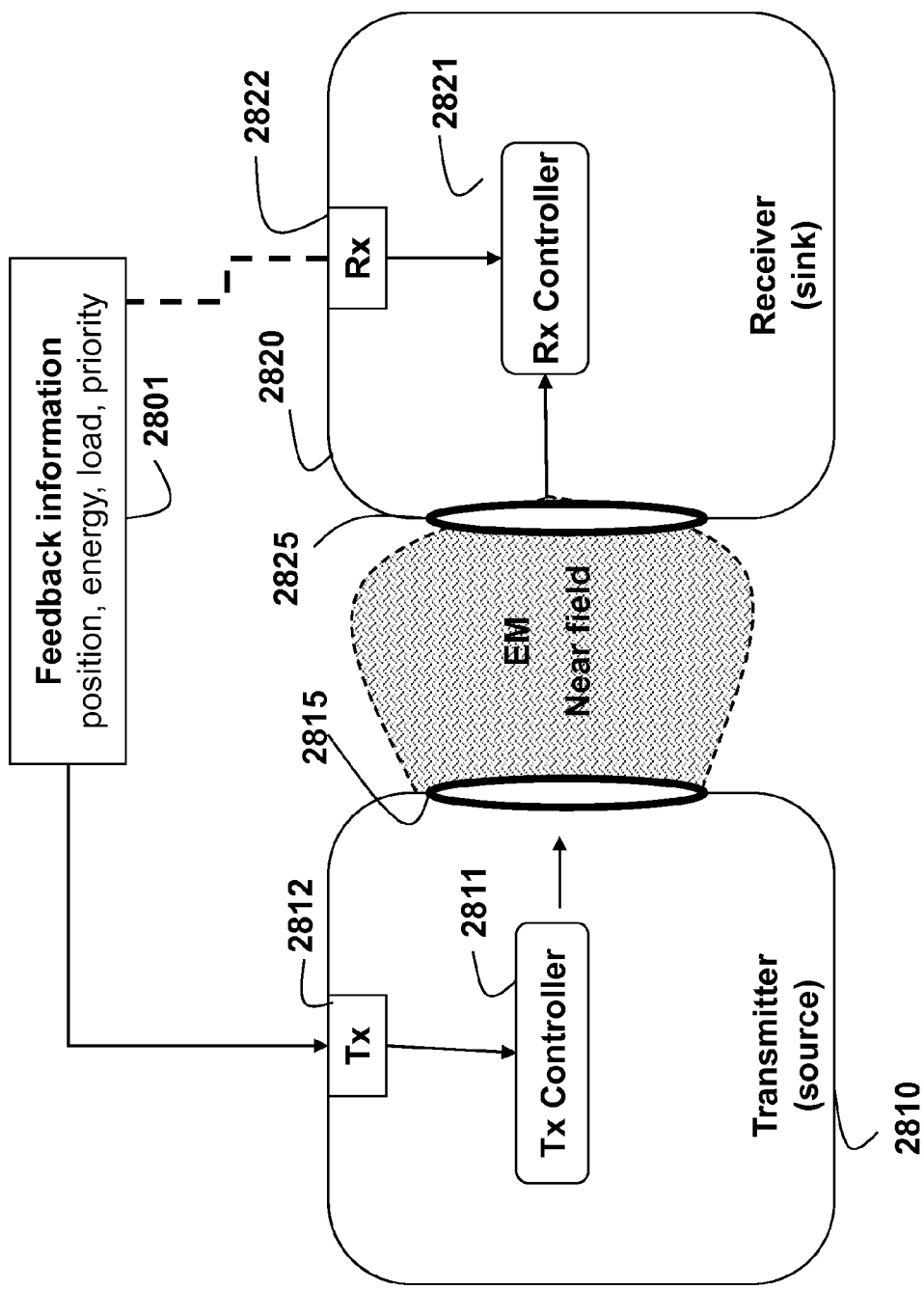
FIG. 28 is a schematic of dynamic optimization of an energy transfer system.

In this system as shown in FIG. 28, we also can use the components as describe above. We assume that the frequencies can range over a significantly portion of the available bandwidth for energy transfer.

In addition to any of the above selected components, a transmitter (source) 2810 has a transmit controller 2811 and a receive communications link, such as a local transmit (Tx) RF chain 2812. The Tx controller 2811 is connected to an energy source 2815, which can either be a single resonating object, or an array of resonating object as described above.

Each receiver (source) 2820 has a receive controller 2821 and a receive (Rx) RF chain 2822. The Rx controller 2821 is connected to an energy sink 2825, which can either be a single resonating object, or an array of resonating object as described above. The Rx controller can measure an amount of the energy received.

This way the receiver can inform the transmitter of the receiver's position, the available energy, required power, priority, and the like, in a feedback message 2801. The Tx controller 2821 transmits feedback information 2801 to the Tx controller 2811.

Then, the transmitter can optimize the transmitter frequency, and optionally, other transmitter parameters such as load, phase, and impedance through the matching network. Initially, the controller 2811 uses a "smart" optimization method, which scans continuously through the available frequencies to determine optimal candidate frequencies, and then preferentially tries those frequencies first when a receiver requests energy.

In another embodiment, the controller 2811 stores candidate frequencies that could be optimal for a moving receiver at particular positions. These frequencies can be dynamically, and can automatically accommodate changing conditions such as extensions to the system, or extraneous metal in the environment.

The feedback information 2601 can include, position, energy received, power required, priority, or combinations thereof. If there are multiple receivers, the controller can dynamically optimize the characteristics of the EM near-field so that energy is distributed to the receiver according to the feedback.

In a wireless energy transfer system with multiple resonators in an array, such as might be used for mobile robots in a factory or railed vehicles such as trains, any particular driving frequency generates a series of nodes and antinodes in the EM field across the array. Thus, any single wireless power device must in some way accommodate the possibility that it could be positioned at a location where the receiver is located at a field node, and so couples to essentially zero energy out of the resonant array.

Figure 29:
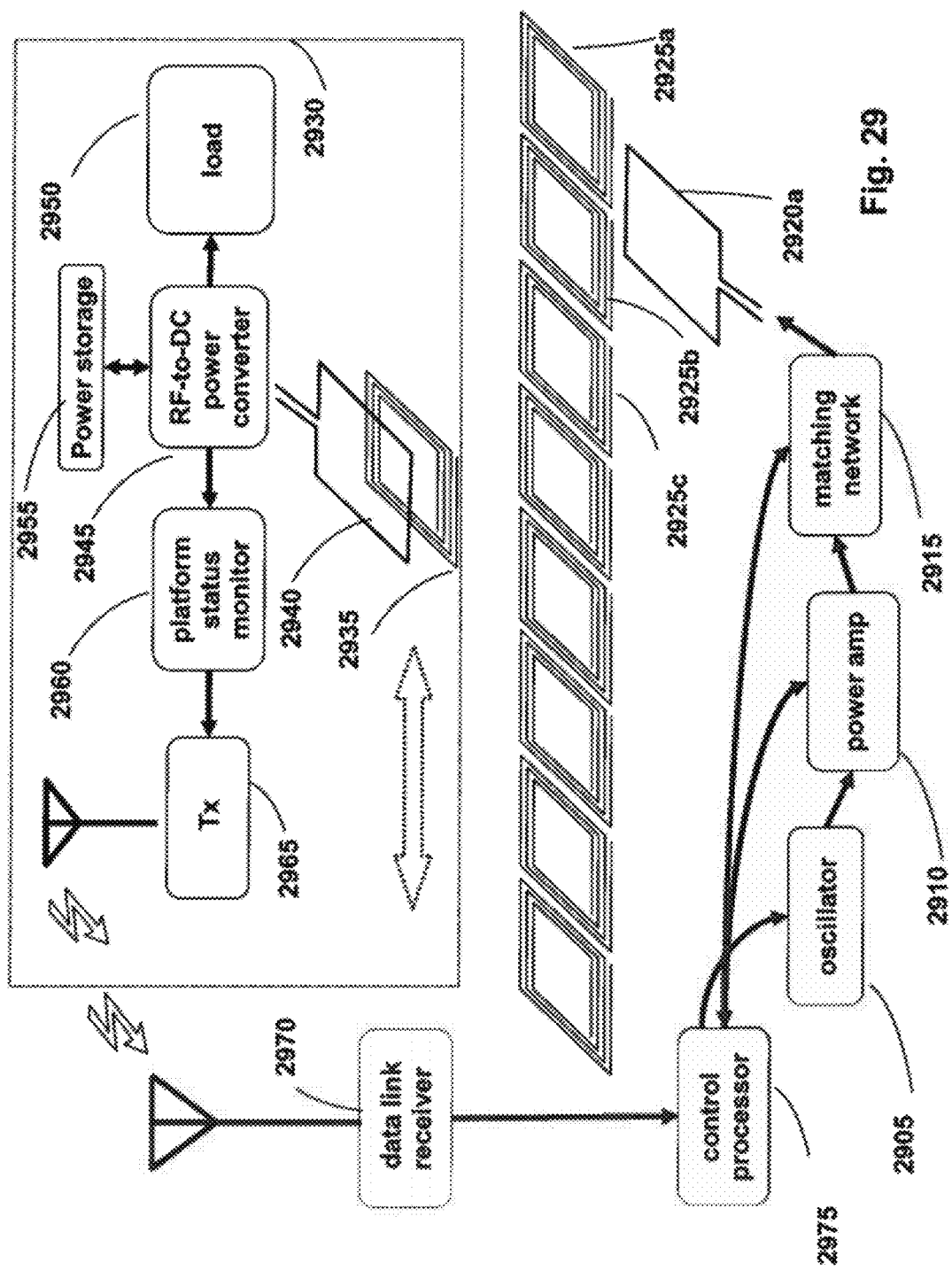
FIG. 29 is a detailed schematic of the system of FIG. 27.

Referring now to FIG. 29, an oscillator 2905 provides a controllable RF signal to a power amplifier 2910. The RF energy is impedance-matched by matching network 2915a and applied to a loop antenna 2920a. The RF energy is coupled from the loop antenna into the array of closely-placed resonators 2925a-c, etc. For simplicity, the resonator array is linear. However other arrangements are also possible as described above, e.g., curves, loops, forks, intersections, grids, T-junctions, and the like. The array forms an arbitrary path, or covers an arbitrary surface.

Only one matching network and coupling loop is shown. However more than one matching network and coupling loop can be used within a single array. The matching network(s) are capable of varying the phase, amplitude, and energy throughput to each of their associated loop antennas.

Because of the close spacing of the resonators, the RF energy is coupled between resonators 2925a-c, and distributed throughout the array. The coupling efficiency can be greater than 90% across the array.

Some fraction the RF energy is coupled from the array of resonators onto a resonator 2935 and a receive loop antenna 2940 on mobile device 2930. The device can be a train, a forklift truck, a mobile factory robot, a portable electronic device, or any other mobile device that consumes power.

The RF energy from receive loop antenna converted to DC, or other convenient form by a RF-to-DC power converter 2945. The power is used to supply the load 2950, such as the drive motors on a train, forklift, or mobile robot, or a charger in a portable device. Additionally, the power converter 2945 can be connected to a local power storage 2955, e.g., a rechargeable battery, a super-capacitor, or a flywheel.

An important operating parameters of the power converter 2945, in particular the available energy from the receive loop antenna, as well as any available energy in the local storage is communicated to a status monitor 2960. The status information is communicated via a transmitter (Tx) 2965 to a receiver (Rx) 2970. For simplicity, the data link is depicted as a separate link, however, an impedance change in resonator or loop antenna can propagate the status to the receiver, using radiofrequency identification (RFID) technology.

The receiver demodulates signal carrying the status information, and transfers data a controller 2975. The controller uses the current and previous status information to control various parameters of the system, such as the frequency of the oscillator, the gain of the power amplifier, and the matching parameters, (such as source and sink capacitances and inductances, of the impedance matching network(s).

Figure 30:
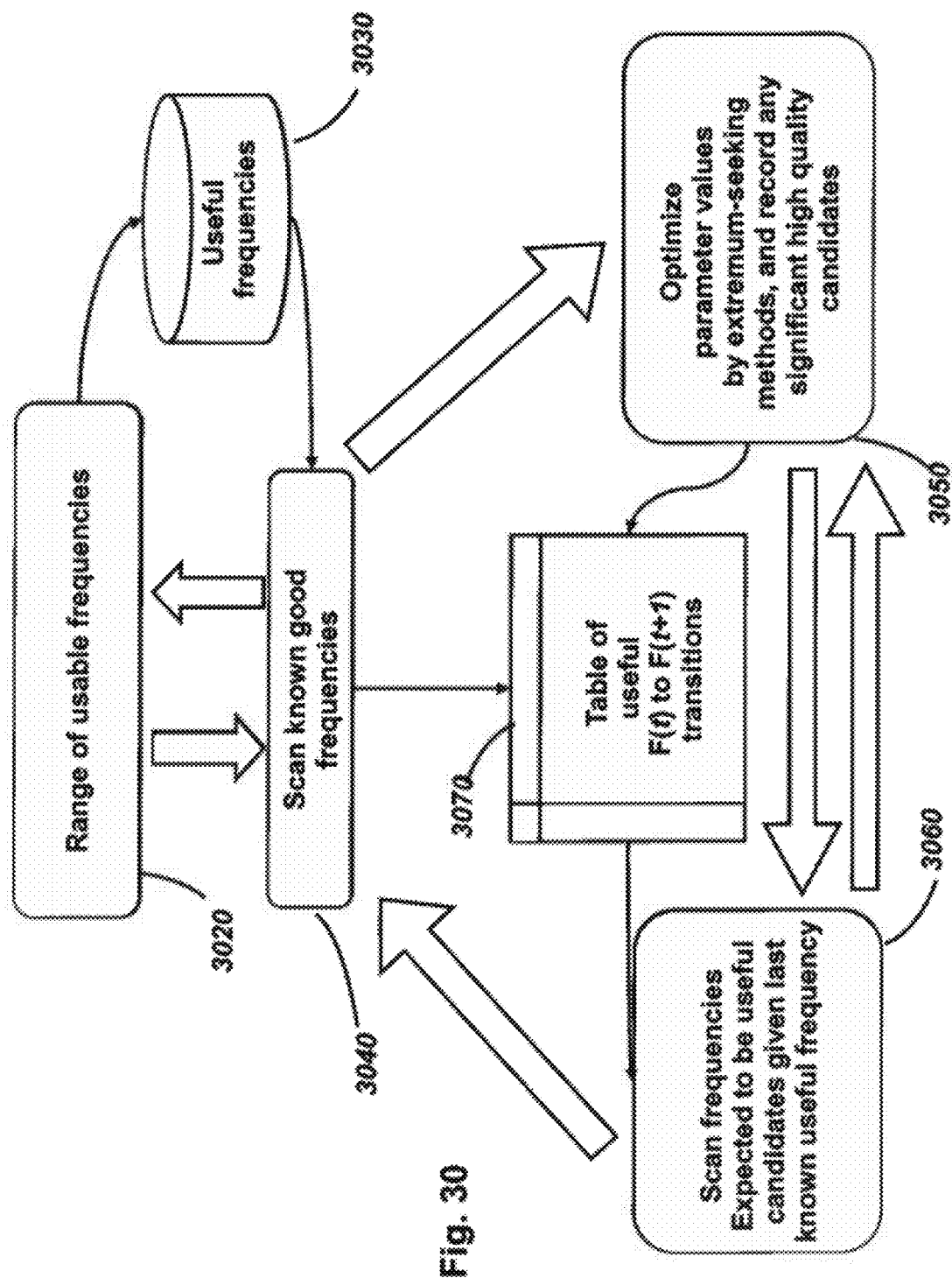
FIG. 30 is a flow diagram of a process for dynamically optimizing the system of FIG. 28.

FIG. 30 shows control process to select the optimal operating parameters for the controllable aspects of oscillator, power amplifier, and matching networks. We describe this process in terms of frequency only for a single matching network. However, the same process applies to any controllable parameter of the oscillator, power amplifier, or matching networks.

The control process initiates a scan 3040 of a range of usable frequencies 3020. The frequencies can be predetermined and preprogrammed. In general, the frequencies are in a band from approximately 10% above the resonant frequency of a single resonator, to approximately 20% below the resonant frequency of the resonator. It is not necessary for the scan to be "dense" in terms of covering every frequency. In general, a scan interval of roughly 1% of the resonator frequency yields a useful set of frequencies 3030, where high coupling efficiency is achieved and significant amounts of energy are being coupled to the receive loop, and available to the power converter.

The control processor determines these useful frequencies by commanding the oscillator to each of these test frequencies, with the parameters of the power amplifier and matching network set to nominal values, and reading the data link information. Each of the useful frequencies is stored. After the set of test frequencies has been scanned and the set of known good frequencies stored, the processing scans the useful frequencies.

During the scan, each previously determined useful frequencies is tried in succession, and the coupling efficiency is verified. Because generally there are only a relatively small number of useful frequencies, the scan can be rapidly completed, and the optimal frequency is quickly determined. At this point the oscillator is set to that frequency and useful amounts of energy can be transferred to the device.

In another embodiment, instead of continuing with the scan of useful frequencies, the scanning is terminated when status information indicates that sufficient energy is received.

After the controller determines that the energy transfer system is operating correctly and stably at a particular frequency, the current operating parameters of the system are stored as a row in a table 3070.

At this point the process transfers control to an extremum-seeking optimizer process 3050 to obtain an even better efficiency. The optimizer can use any known method of extremum seeking to optimize the efficiency by slightly perturbing the parameter values such as frequency to the oscillator, power level to amplifier, and matching network parameters, and using the feedback information. These improved parameters are stored as additional elements in a particular table row of table.

The simplest extremum seeking optimizing sets a parameter to a slightly lower and slightly higher value than is predicted to be optimal. Whichever value setting results in a better result becomes the new predicted optimal value.

Another embodiment art uses sinusoidal perturbation for extremum seeking. In this case, a parameter is varied with a small-amplitude low-frequency sinusoid, and the measurable output is filtered to obtain a sinusoid at the same frequency as the parameter variation sinusoid. If a phase of the recovered sinusoid is near zero degrees, then the controlled parameter affects the output result with a positive slope, and the parameter should be increased to maximize the result. If the phase of the recovered sinusoid is near 180°, then the parameter affects the output result with negative slope and the controlled parameter should be decreased in order to maximize the result.

Another embodiment of extremum-seeking perturbs the parameter with stochastic noise, for example, Gaussian white noise, with a low amplitude. The resulting perturbed parameter is time-correlated with the measured result. If the time correlation is positive, then the parameter should be increased. If the time correlation is negative, then the parameter should be decreased.

Another embodiment uses stepwise hill-climbing. Hill-climbing is an iterative optimization technique that uses a local search starting with an arbitrary solution to a problem. It then attempts to find a better solution by incrementally changing a single element of the solution. If the change produces a better solution, an incremental change is made to the new solution, repeating until no further improvements can be found.

The optimization continues until such time as system dynamics or external actions cause the overall system efficiency to drop below an acceptable performance level. When this occurs, the optimization process transfers control to an expected-to-be-useful scan procedure 3060. The expected-to-be-useful scan procedure uses the table of prior known-good transitions 3070 to check the set of frequencies most likely to give acceptable performance, given the current frequency. Thus, the table is analogously to a branch-prediction logic, where statistical knowledge of whether a particular branch is taken or not on a prior iteration has high likelihood of predicting whether the same branch will be taken on the current iteration.

For example, if the current frequency was 27.123 M Hz, and the table indicates that in the past, the current of frequency of 27.123 M Hz was successfully succeeded by operation at 26.987 M Hz, 25.246 M Hz, and 24.369 MHz, then the expected-to-be-useful procedure immediately scans 26.987 M Hz, 25.246 MHz, and 24.369 M Hz as the most likely candidates for acceptable operation.

If the expected-to-be-useful process 3060 determines that any one of these frequencies produces an acceptable operation, it sets the current operating frequency to the acceptable frequency, and transfers control back to the extremum-based optimizing process. If the expected-to-be-useful process exhausts the set of highly likely useful frequencies from the table, then it transfers control to the process 3040 to consider a larger set of frequencies.

The scan does not need to be linear, it can be opportunistic. The reason for this is that the actual implementation of oscillator can have very different characteristics in terms of how fast the oscillator can retune to a new frequency. For example, if oscillator is implemented as a phase locked loop, small changes in frequency can be accomplished quicker than large changes in frequency because small changes in frequency need only change the charge on the phase locked loop capacitor of the oscillator. In this case, a linear scan can be very fast compared to a more randomized scan. On the other hand if the oscillator is implemented as a direct digital frequency synthesizer, then the frequency can be changed as rapidly as the registers can be reloaded. In that case, a shell sort or binary search can be faster, especially if the search is done intelligently. For example, a binary search can obviously be done in a breadth-first way completely, but a better way to do it might be to perform several layers of breadth-first search, and then perform depth-first search in the most promising areas.

Another embodiment interlaces short periods of scanning process with longer periods of useful energy delivery during the extremum-seeking optimization process. Thus, if the feedback information indicates that the device has sufficient locally stored energy storage to absorb a short, perhaps a few milliseconds, outage, then an opportunity to further scan is presented and so the scanning for known useful frequencies can be 220 be activated for a few milliseconds.

In the case that the array needs transfers energy to multiple receiving devices, the controller optimizes the energy transferred to all devices. In the general case, this is a very difficult problem, because the actual power demand by each load can vary from second to second. Therefore, the feedback information indicates power demands, as well as the status of the local power storage.

In one solution, the controller multiplexes the RF energy output between the devices in proportion to their individual power demands. For example, if one device demands 100 watts, and another device demands 200 watts, then the controller processor time slices the processes according the power demands.

Therefore, it may be necessary for the controller to redefine the acceptability criterion of a frequency or operating parameter set to be a mixed criterion of acceptable power delivery to each of N different devices concurrently. In this case, it is reasonable to consider efficiency as the average efficiency weighted per watt of power transfer, so that optimization seeks overall maximum efficiency rather than maximum efficiency for a particular device.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A system for transferring energy wirelessly, comprising:
a source configured to transmit energy as an EM near-field according to parameters, wherein the source further comprises:
a transmit RF chain; and
a transmit controller; and
a sink configured to receive the energy, wherein the sink further comprises:
a receive RF chain; and
a receive controller configured to measure the energy received as feedback information and to transmit the feedback information to the sink, and wherein the transmit controller dynamically optimizes the parameters by scanning a sparse set of possible operating parameters and performing an incremental improvement on the parameters by an extremum-seeking optimization modifying at least one parameter using a sinusoidal perturbation to determine a corresponding sinusoidal perturbation of the energy and decreasing or increasing the parameter based on a sign of a slope of the sinusoidal perturbation of the energy.

2. The system of claim 1, wherein the sink is mobile.

3. The system of claim 1, wherein the EM near-field is transmitted by a single resonator.

4. The system of claim 2 wherein the EM near-field is transmitted by an array of resonators arranged along a path of the mobile sink.

5. The system of claim 4, wherein the path includes forks, loops, intersections, grids, or T-junctions.

6. The system of claim 1, wherein the sparse set of possible operating parameters is scanned linearly.

7. The system of claim 1, wherein the sparse set of possible operating parameters is scanned using a binary search.

8. The system of claim 1, where the scanning is performed opportunistically.

9. The system of claim 1, wherein the extremum-seeking optimization is by sinusoidal excitation.

10. The system of claim 1, wherein the extremum-seeking optimization is by stochastic excitation.

11. The system of claim 1, wherein the extremum-seeking optimization is by stepwise hill-climbing.

12. The system of claim 1, wherein the set of possible operating parameters is stored and reused.

13. The system of claim 1, wherein multiple mobile sink receive the energy.

14. The system of claim 13, wherein energy is time-sliced among the multiple mobile sinks.

15. The system of claim 1, wherein the sink is arranged in a vehicle.

16. The system of claim 1, wherein the sink is arranged in a personal electronic device.

17. The system of claim 1, wherein the parameters relate to frequencies, phases, required power, impedance, position, priorities or combinations thereof.

18. A system for transferring energy wirelessly, comprising:
   a sink; and
   a source for transferring energy wirelessly to the sink, wherein the sink is configured to move to a relative position with respect to the source to receive the energy via resonant coupling of evanescent waves, the source comprising:
      an array of objects, wherein each object is electromagnetic (EM) and non-radiative and generates an EM near-field in response to receiving the energy, wherein each object in the array is electrically isolated from the other objects and arranged at a distance from all other objects; and
      a controller for scanning a set of possible operating frequencies of the EM near-field and for selecting, from the set of possible operating frequencies using an extremum-seeking optimization, a frequency optimizing the energy transfer, wherein the extremum-seeking optimization comprises:
   modifying at least one parameter using a sinusoidal perturbation to determine a corresponding sinusoidal perturbation of the energy;
   increasing a value of the parameter if a slope of the sinusoidal perturbation of the energy is positive; and
   decreasing the value of the parameter if the slope of the sinusoidal perturbation of the energy is negative.

* * * * *